US009832345B2

(12) United States Patent
Mitsuhashi

(10) Patent No.: US 9,832,345 B2
(45) Date of Patent: Nov. 28, 2017

(54) INFORMATION PROCESSOR, IMAGE FORMING APPARATUS, TERMINAL APPARATUS, INFORMATION PROCESSING SYSTEM AND NON-TRANSITORY COMPUTER READABLE MEDIUM FOR ESTABLISHING CONNECTION BETWEEN APPARATUSES

(71) Applicant: FUJI XEROX CO., LTD., Tokyo (JP)

(72) Inventor: Hiroyuki Mitsuhashi, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/925,398

(22) Filed: Oct. 28, 2015

(65) Prior Publication Data
US 2016/0344898 A1   Nov. 24, 2016

(30) Foreign Application Priority Data
May 18, 2015   (JP) .................. 2015-100823

(51) Int. Cl.
*H04N 1/44* (2006.01)
*H04N 1/00* (2006.01)
*H04L 29/06* (2006.01)
*H04L 9/32* (2006.01)
*H04L 9/08* (2006.01)

(52) U.S. Cl.
CPC ......... *H04N 1/4413* (2013.01); *H04L 9/0822* (2013.01); *H04L 9/3226* (2013.01); *H04L 9/3273* (2013.01); *H04L 63/083* (2013.01); *H04N 1/00307* (2013.01); *H04N 2201/0077* (2013.01)

(58) Field of Classification Search
CPC .... H04N 1/4413; H04L 9/3226; H04L 63/083
USPC .............................. 358/1.14, 1.15; 709/227
See application file for complete search history.

(56) References Cited

U.S. PATENT DOCUMENTS

| 6,772,331 | B1 | 8/2004 | Hind et al. |
| 6,886,095 | B1 | 4/2005 | Hind et al. |
| 6,980,660 | B1 | 12/2005 | Hind et al. |
| 2007/0264991 | A1* | 11/2007 | Jones ............... H04M 1/7253 455/420 |
| 2008/0240068 | A1* | 10/2008 | Ishimoto .......... H04W 12/06 370/345 |
| 2010/0082978 | A1* | 4/2010 | Suzuki ............. H04L 63/083 713/168 |
| 2013/0148149 | A1* | 6/2013 | Park ................. G06F 3/1296 358/1.13 |

(Continued)

FOREIGN PATENT DOCUMENTS

JP   2008-165719 A   7/2008
JP   2010-158030 A   7/2010

*Primary Examiner* — Jamares Q Washington
(74) *Attorney, Agent, or Firm* — Sughrue Mion, PLLC

(57) ABSTRACT

An information processor includes: a responding unit that transmits data including a predetermined password to a terminal apparatus to make a response to an inquiry from the terminal apparatus, without user operation; and a connection establishing unit that performs processing to establish connection in a case where a connection request using the predetermined password transmitted by the responding unit is accepted from the terminal apparatus, the connection request being regarded as a request to establish connection between the information processor and the terminal apparatus.

16 Claims, 16 Drawing Sheets

(56) References Cited

U.S. PATENT DOCUMENTS

2014/0355047 A1* 12/2014 Lee .................. G06F 3/1292
358/1.15
2014/0355057 A1* 12/2014 Jang ................ G06K 7/10297
358/1.15

* cited by examiner

INFORMATION PROCESSOR, IMAGE FORMING APPARATUS, TERMINAL APPARATUS, INFORMATION PROCESSING SYSTEM AND NON-TRANSITORY COMPUTER READABLE MEDIUM FOR ESTABLISHING CONNECTION BETWEEN APPARATUSES

CROSS REFERENCE TO RELATED APPLICATION

This application is based on and claims priority under 35 USC §119 from Japanese Patent Application No. 2015-100823 filed May 18, 2015.

BACKGROUND

Technical Field

The present invention relates to an information processor, an image forming apparatus, a terminal apparatus, an information processing system, and a non-transitory computer readable medium.

Related Art

In establishing connection between devices while maintaining security, a user may be required to input a password or a personal identification number (PIN) code, or to push a button provided in the apparatus for permitting the connection, in some cases.

SUMMARY

According to an aspect of the present invention, there is provided an information processor including: a responding unit that transmits data including a predetermined password to a terminal apparatus to make a response to an inquiry from the terminal apparatus, without user operation; and a connection establishing unit that performs processing to establish connection in a case where a connection request using the predetermined password transmitted by the responding unit is accepted from the terminal apparatus, the connection request being regarded as a request to establish connection between the information processor and the terminal apparatus.

BRIEF DESCRIPTION OF THE DRAWINGS

An exemplary embodiment of the present invention will be described in detail based on the following figures, wherein.

DETAILED DESCRIPTION

Hereinafter, exemplary embodiments of the present invention will be described in detail with reference to attached drawings.

Exemplary Embodiment 1

System Configuration

Figure 1:
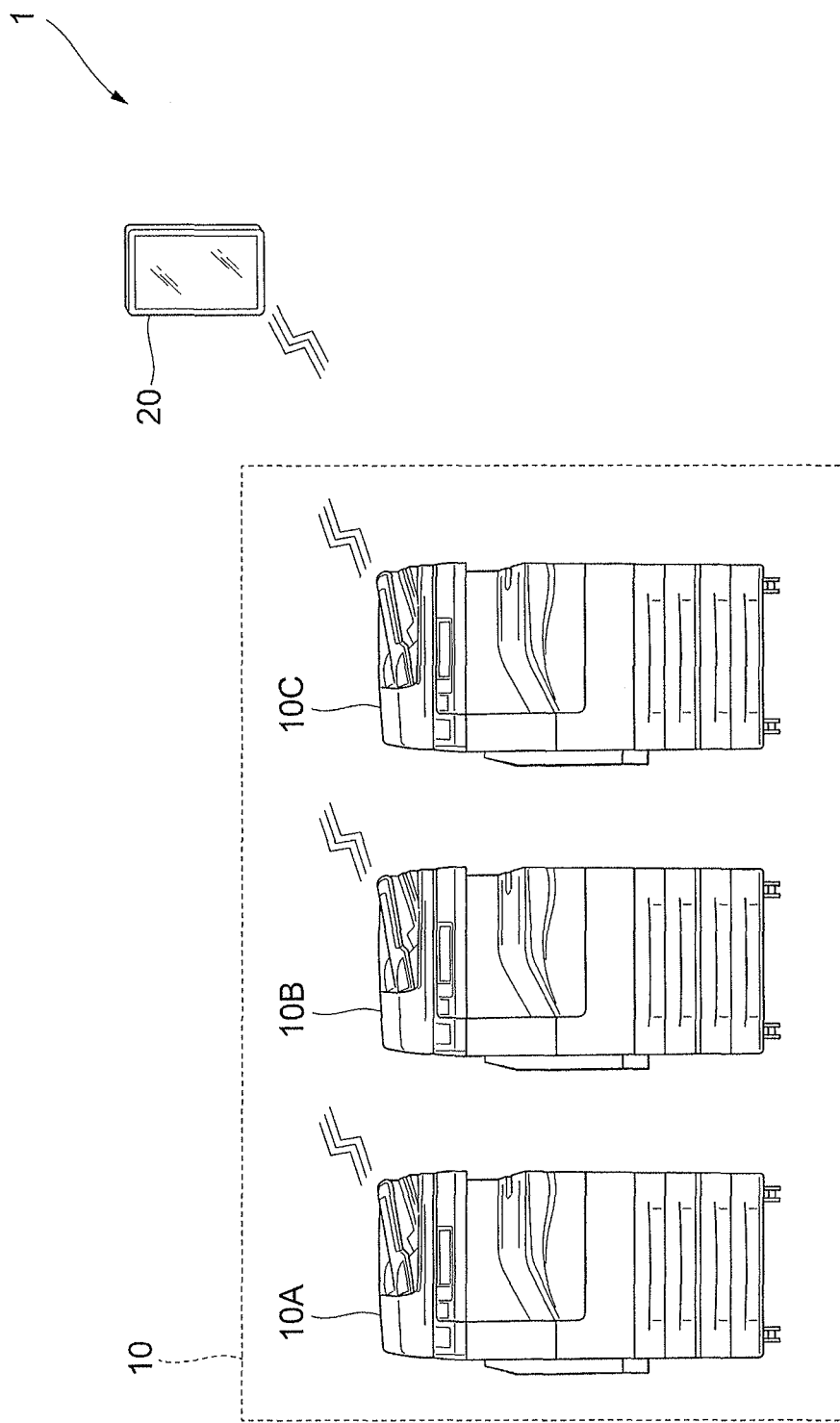
FIG. 1 is a view illustrating one example of the entire configuration of the image processing system to which the exemplary embodiments of this invention are applied.

First, description will be given for an entire configuration of an image processing system 1 to which the exemplary embodiments of this invention is applied. FIG. 1 is a view illustrating one example of the entire configuration of the image processing system 1 to which the exemplary embodiments of this invention are applied. As shown in the figure, the image processing system 1 includes an image forming apparatus 10A, an image forming apparatus 10B, and an image forming apparatus 10C, which function to form an image, and a portable terminal 20 that is a portable computer apparatus. The image forming apparatus 10A, the image forming apparatus 10B, the image forming apparatus 10C, and the portable terminal 20 conform to the wireless local area network (LAN) standard of the wireless fidelity (Wi-Fi) (registered trademark), and are wirelessly communicatable with each other. Thus, connection between the image forming apparatus 10A, the image forming apparatus 10B, the image forming apparatus 10C, and the portable terminal 20 is established by wireless communication, and data are transmitted and received therebetween.

Note that, although the image forming apparatus 10A, the image forming apparatus 10B, and the image forming apparatus 10C are shown in FIG. 1, they may be referred to as image forming apparatuses 10 if they are not necessarily discriminated from each other. Further, although the three image forming apparatuses 10 are shown in the example of FIG. 1, four or more image forming apparatuses 10 may be provided.

In the exemplary embodiments, the image processing system 1 is used as one example of an information processing system. The image forming apparatus 10 is used as one example of an information processor, and the portable terminal 20 is used as one example of a terminal apparatus.

The image forming apparatus 10 is an apparatus having, for example, a print function, a scan function, a copy function and a facsimile function, forms an image on a recording medium such as a sheet of paper, and outputs the recording medium. After establishment of connection between the image forming apparatus 10 and the portable terminal 20, the image forming apparatus 10 receives a print instruction from the portable terminal 20 by wireless communication, and executes processing of image formation.

The portable terminal 20 is a portable computer apparatus used to instruct the image forming apparatus 10 to execute various kinds of functions, and examples of the portable terminal 20 include smartphones, cellular phones, tablet personal computers (PCs), and note PCs.

The portable terminal 20 includes a function configured to search for, using a discovery protocol, the image forming apparatuses 10 capable of establishing connection with the portable terminal 20 (hereinbelow, the searching function is referred to as device discovery). Examples of the device discovery include Bonjour (registered trademark) and Web Services on Devices (WSD), in which the image forming apparatuses 10 communicatable with the portable terminal 20 and belonging to the same subnet as the portable terminal 20 or another subnet are detected. In addition, for example, the device discovery includes a technique to search for neighboring image forming apparatuses 10 existing within the area where radio waves are reachable from the portable terminal 20, which is used in Wi-Fi, or Wi-Fi Direct (registered trademark) for directly connecting devices.

The portable terminal 20 outputs a request packet in the device discovery, to search for the available image forming apparatuses 10. Further, the portable terminal 20 detects the available image forming apparatuses 10 on the basis of response of the image forming apparatuses 10 to the request packet. The detected image forming apparatuses 10 are displayed on the screen of the portable terminal 20 as a search result list. In this situation, if a user chooses the image forming apparatus 10 as a destination to be connected with the portable terminal 20, from the search result list, the portable terminal 20 transmits a connection request to the chosen image forming apparatus 10.

In the exemplary embodiment, when the portable terminal 20 performs device discovery, the image forming apparatus 10 embeds a password to a specific area of a response packet, and makes a response to the inquiry from the portable terminal 20. At this time, the image forming apparatus 10 converts (encrypts) the predetermined password for connection (hereinbelow, referred to as a connection password) as a password used for authorization to establish connection with another device, on the basis of a specific method. Then, the image forming apparatus 10 embeds, to the response packet, the encrypted password on the basis of the specific method (hereinafter, the encrypted password on the basis of the specific method is referred to as the encrypted password), and makes a response.

On the other hand, the portable terminal 20 detects the image forming apparatuses 10 on the basis of the response. Then, if a user chooses the image forming apparatus 10 as the destination of the connection from the search result, the portable terminal 20 decrypts the password (that is, the encrypted password) included in the response packet that has been received from the chosen image forming apparatus 10, and restores the encrypted password to the original password. Then, the portable terminal 20 transmits the original password obtained by the decryption to the image forming apparatus 10. In this manner, the password is exchanged between the portable terminal 20 and the image forming apparatus 10, to establish connection while maintaining security.

<Hardware Configuration of Image Forming Apparatus>

Figure 2:
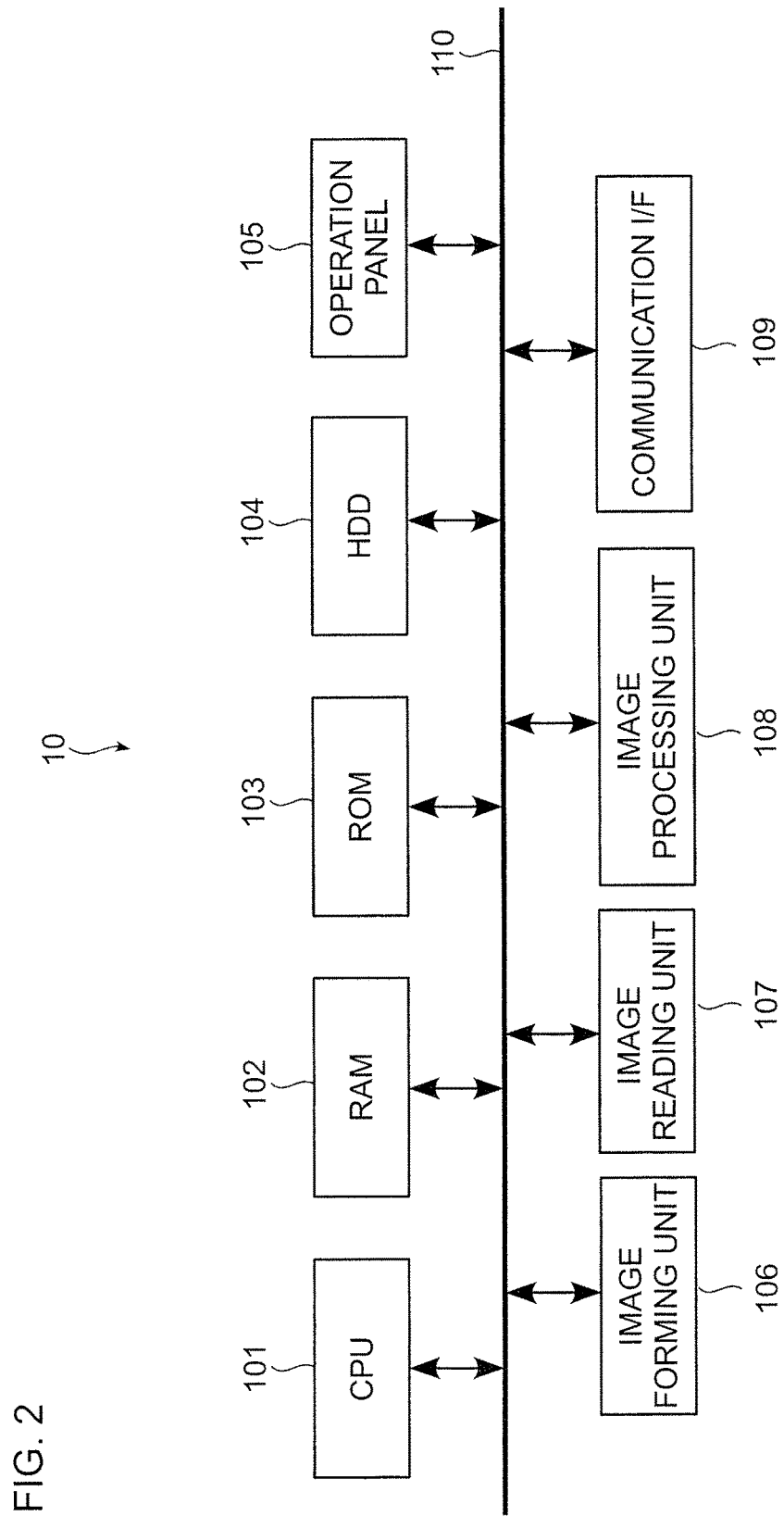
FIG. 2 is a diagram illustrating one example of a hardware configuration of the image forming apparatus.

Next, description will be given for a hardware configuration of the image forming apparatus 10. FIG. 2 is a diagram illustrating one example of a hardware configuration of the image forming apparatus 10. As shown in the figure, the image forming apparatus 10 includes a central processing unit (CPU) 101, a random access memory (RAM) 102, a read only memory (ROM) 103, a hard disk drive (HDD) 104, an operation panel 105, an image forming unit 106, an image reading unit 107, an image processing unit 108, and a communication interface (hereinafter referred to as a communication I/F) 109. Note that these functional units are connected to a bus 110, and data communication is performed via the bus 110.

The CPU 101 executes various kinds of software such as an operation system (OS) and application. The RAM 102 is a memory used as a working memory for the CPU 101, or the like. The ROM 103 is a memory to store various kinds of programs and the like executable by the CPU 101. The CPU 101 achieves various functions of the image forming apparatus 10 by loading the various kinds of programs stored in the ROM 103 and the like to the RAM 102 to execute the programs. The HDD 104 is a storage area to store input data to various kinds of software, output data from the various kinds of software, and the like.

Here, the program executable by the CPU 101 may be provided by a configuration in which the program has been stored in the ROM 103 in advance, or in form of a computer readable medium such as a magnetic recording medium (magnetic tape, magnetic disk or the like), an optical recording medium (optical disk or the like), a magnetooptical medium, or a semiconductor memory, in which the program has been stored. Alternatively, for example, the program may be provided to the CPU 101 through the Internet.

The operation panel 105 is, for example, a touch panel, displays various kinds of information, and accepts an operation input by a user. Here, the operation panel 105 includes a display on which various kinds of information are displayed, and a position detection sheet that detects the touched position by a finger, a stylus pen or the like. As a unit that detects the touched position, any unit such as a unit that detects the touched position on the basis of the pressure caused by the touch, or a unit that detects the touched position on the basis of the static electricity of the object having touched the panel may be used. As an input unit, a keyboard or the like may be used instead of the touch panel.

The image forming unit 106 as one example of an image forming unit forms an image on a recording medium on the basis of the input image data. Here, the image forming unit 106 is, for example, a printer, and employs an electrophotographic method in which toner attached to the photo conductor is transferred to a recording medium to form an image, or an inkjet method in which ink is injected onto a recording medium to form an image.

The image reading unit 107 reads an image recorded on a recording medium, and generates image data indicating the read image. Here, the image reading unit 107 is, for example, a scanner, and employs a CCD method in which reflection light of light from a light source illuminating a manuscript is scaled down with a lens and then received by charge coupled devices (CCD), a CIS method in which reflection light of light from a LED light source sequentially illuminating a manuscript is received by a contact image sensor (CIS), or the like.

The image processing unit 108 performs, on the input image data, various kinds of image processing such as color correction and tone correction. For example, the image processing unit 108 performs various kinds of image processing on the image data read by the image reading unit 107 or the image data stored in the HDD 104, and then supplies the resultant image data to the image forming unit 106.

The communication I/F 109 includes an antenna for wireless communication, and functions as a communication interface that transmits various kinds of data to the portable terminal 20, and receives various kinds of data from the portable terminal 20.

<Hardware Configuration of Portable Terminal>

Figure 3:
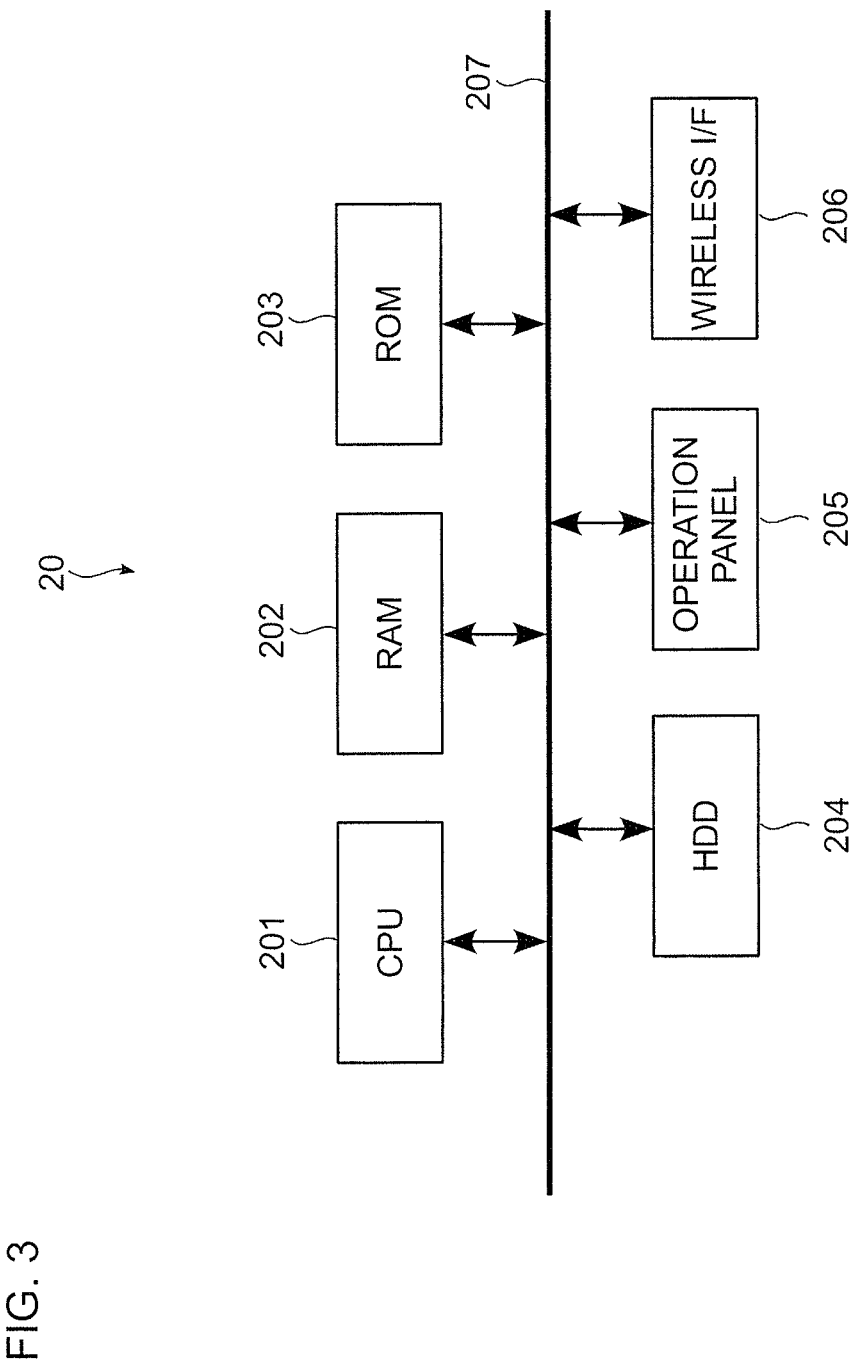
FIG. 3 is a diagram illustrating one example of the hardware configuration of the portable terminal.

Next, description will be given for the hardware configuration of the portable terminal 20. FIG. 3 is a diagram illustrating one example of the hardware configuration of the portable terminal 20. As shown in the figure, the portable terminal 20 includes a CPU 201, a RAM 202, a ROM 203, a HDD 204, an operation panel 205, and a wireless I/F 206. Note that these functional units are connected to the bus 207, and data communication is performed via the bus 207.

The CPU 201 executes various kinds of software such as an OS and application. The RAM 202 is a memory used as a working memory for the CPU 201, or the like. The ROM 203 is a memory to store various kinds of programs and the like executable by the CPU 201. The CPU 201 achieves various functions of the portable terminal 20 by loading the various kinds of programs stored in the ROM 203 and the like to the RAM 202 to execute the programs. The HDD 204 is a storage area to store input data to various kinds of software, output data from the various kinds of software, and the like.

Here, the program executable by the CPU 201 may be provided by a configuration in which the program has been stored in the ROM 203 in advance, or in form of a computer readable medium such as a magnetic recording medium (magnetic tape, magnetic disk or the like), an optical recording medium (optical disk or the like), a magnetooptical medium, or a semiconductor memory, in which the program has been stored. Alternatively, for example, the program may be provided to the CPU 201 through the Internet. In the case where the portable terminal 20 is a smartphone or a cellular phone, a flash storage may be used instead of the HDD 204.

The operation panel 205 is, for example, a touch panel, displays various kinds of information, and accepts an operation input by a user. Here, the operation panel 205 includes a display on which various kinds of information are displayed, and a position detection sheet that detects the touched position by a finger, a stylus pen or the like. As a unit that detects the touched position, any unit such as a unit that detects the touched position on the basis of the pressure caused by the touch, or a unit that detects the touched position on the basis of the static electricity of the object having touched the panel may be used. As an input unit, a keyboard or the like may be used instead of the touch panel.

The wireless I/F 206 includes an antenna for wireless communication, and functions as a communication interface that transmits various kinds of data to the image forming apparatus 10 and receives various kinds of data from the image forming apparatus 10.

<Functional Configuration of Image Forming Apparatus>

Figure 4:
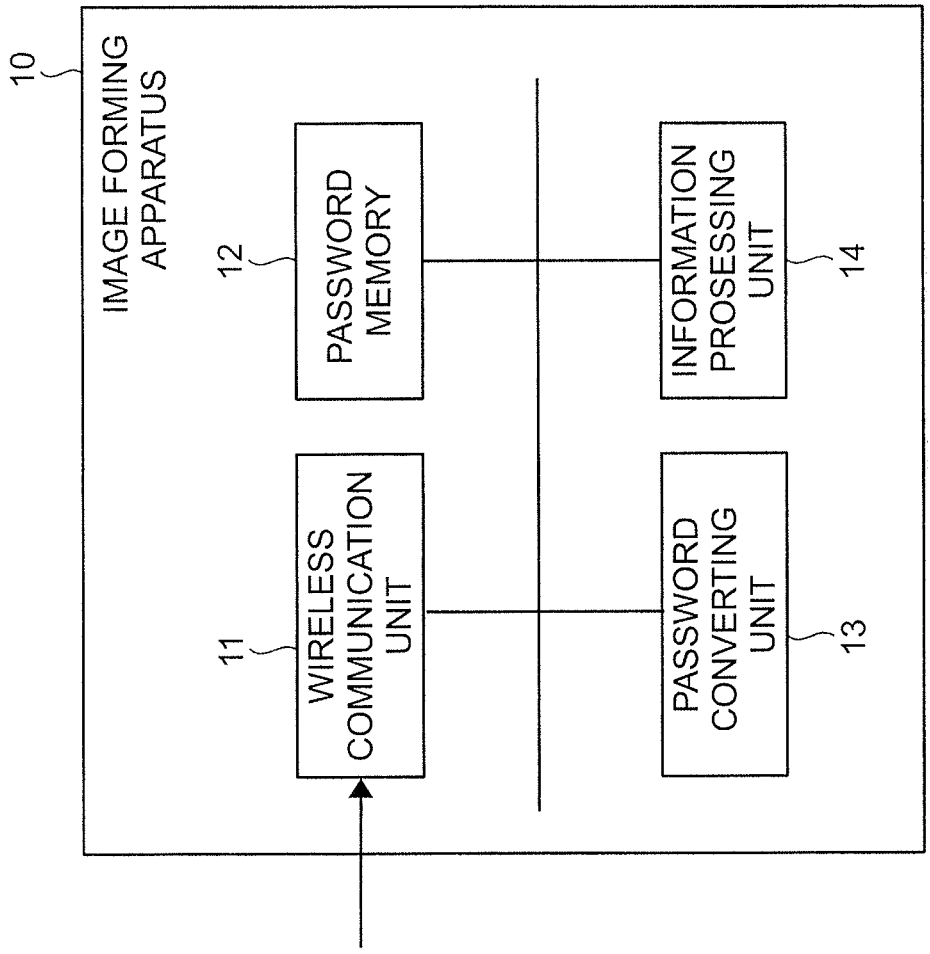
FIG. 4 is a block diagram illustrating one example of the functional configuration of the image forming apparatus according to the exemplary embodiment 1.

Next, description will be given for the functional configuration of the image forming apparatus 10. FIG. 4 is a block diagram illustrating one example of the functional configuration of the image forming apparatus 10 according to the exemplary embodiment 1.

The image forming apparatus 10 includes a wireless communication unit 11 that transmits data to the portable terminal 20 and receives data from the portable terminal 20, a password memory 12 in which the predetermined connection password is stored, a password converting unit 13 that encrypts the connection password on the basis of the specific method, and an information processing unit 14 that performs processing such as generation of a response packet in response to a request packet and processing in response to a connection request.

The wireless communication unit 11 transmits data to the portable terminal 20 and receives data from the portable terminal 20, using wireless communication. Here, the wireless communication unit 11 receives a request packet of device discovery from the portable terminal 20, and transmits a response packet responding to the request packet, to the portable terminal 20, for example. Further, the wireless communication unit 11 accepts a connection request from the portable terminal 20, and transmits a response to the connection request to the portable terminal 20, for example.

In the password memory 12, the predetermined connection password is stored. The connection password has been prepared in advance as a password used for authorization to establish connection with other devices.

The password converting unit 13 converts (encrypts) the connection password stored in the password memory 12, on the basis of the specific method. Here, if the wireless communication unit 11 receives a request packet of device discovery from the portable terminal 20, the password converting unit 13 obtains the connection password from the password memory 12, and encrypts the connection password. The specific method used here is a predetermine method as a method for encrypting the connection password. In the exemplary embodiment, the portable terminal 20 also employs the method same as the specific method, as described hereinbelow.

If the wireless communication unit 11 receives a request packet of device discovery from the portable terminal 20, the information processing unit 14 generates a response packet responding to the request packet. Here, if a user does not perform operation for generating a response packet on the image forming apparatus 10, the information processing unit 14 generates a response packet. Specifically, the information processing unit 14 embeds, to the specific area of the packet, the encrypted password that has been subjected to the encryption by the password converting unit 13, and generates the response packet. The specific area is an area set in advance as an area where the password is embedded. Then, the information processing unit 14 transmits the generated response packet to the portable terminal 20 through the wireless communication unit 11 to make a response to the portable terminal 20.

Further, upon accepting a connection request from the portable terminal 20 through the wireless communication unit 11, the information processing unit 14 determines whether the password included in the connection request corresponds to the password to be encrypted into the encrypted password embedded into the response packet (that is, the connection password). If the password included in the connection request corresponds to the connection password, the connection is permitted. In this case, the information processing unit 14 transmits a notification indicating the connection is permitted, to the portable terminal 20 through the wireless communication unit 11. Thereby, the connection is established between the image forming apparatus 10 and the portable terminal 20.

Here, in the exemplary embodiment, the information processing unit 14 functions as one example of a responding unit or a connection establishing unit. The password converting unit 13 functions as one example of an encrypting unit included in the information processor.

<Functional Configuration of Portable Terminal>

Figure 5:
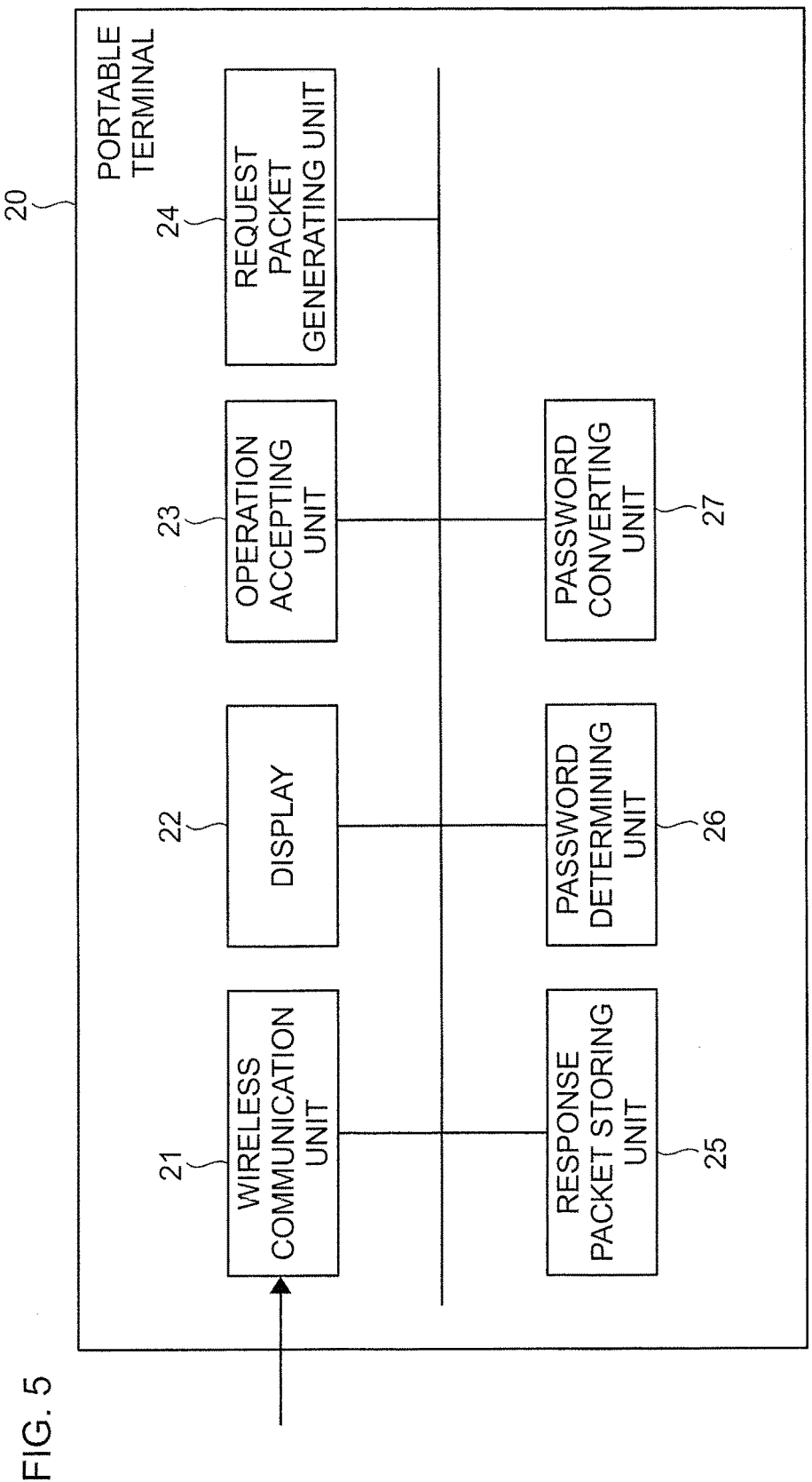
FIG. 5 is a block diagram illustrating one example of the functional configuration of the portable terminal according to the exemplary embodiment 1.

Next, description will be given for the functional configuration of the portable terminal 20. FIG. 5 is a block diagram illustrating one example of the functional configuration of the portable terminal 20 according to the exemplary embodiment 1.

The portable terminal 20 includes a wireless communication unit 21 that transmits data to the image forming apparatus 10 and receives data from the image forming apparatus 10, a display 22 on which various kinds of screens are displayed, an operation accepting unit 23 that accepts operation input by a user, and a request packet generating unit 24 that generates a request packet of device discovery. Further, the portable terminal 20 includes a response packet storing unit 25 in which a response packet received from the image forming apparatus 10 is stored, a password determining unit 26 that determines whether encrypted data by the specific method is included in the response packet, and a password converting unit 27 that decrypts the encrypted data.

The wireless communication unit 21 transmits data to the image forming apparatus 10 and receives data from the image forming apparatus 10, using wireless communication. Here, the wireless communication unit 21 transmits a request packet to the image forming apparatus 10 by executing device discovery, and receives a response packet responding to the request packet from the image forming apparatus 10, for example. Further, for example, if a user chooses the image forming apparatus 10 as a destination of connection, the wireless communication unit 21 transmits a connection request to the chosen image forming apparatus 10, and receives a response to the connection request, from the image forming apparatus 10.

The display 22 is, for example, an operation panel 205, and various kinds of screens are displayed to a user. Here, the display 22 displays a list of the detected image forming apparatuses 10 as a search result of device discovery, for example.

The operation accepting unit 23 accepts operation input by a user through touch to the operation panel 205 by a user, for example. Here, for example, if a user chooses a button to execute device discovery, the operation accepting unit 23 accepts operation input to execute the device discovery. Further, for example, if a user chooses one image forming apparatus 10 from the search result list of the device discovery, the operation accepting unit 23 accepts operation input in which the image forming apparatus 10 is chosen as a destination of connection.

The request packet generating unit 24 generates a request packet of device discovery, and searches for connectable image forming apparatuses 10 using the generated request packet. That is, the request packet generating unit 24 transmits the request packet to the communicatable image forming apparatuses 10 belonging to the same subnet or different subnets, through the wireless communication unit 21. Further, the request packet generating unit 24 transmits the request packet to the neighboring image forming apparatuses 10 existing within the area where wireless radio waves are reachable, through the wireless communication unit 21.

In the response packet storing unit 25, the response packet received from the image forming apparatus 10 is stored, as a response to the request packet. Here, in the response packet storing unit 25, data in the specific area of the response packet (that is, the area where the encrypted password is embedded) is stored out of the data of the response packet. However, since the data to be stored only has to include data in the specific area, the whole of the response packet may be stored in the response packet storing unit 25, for example.

If the operation accepting unit 23 accepts operation input in which one image forming apparatus 10 is chosen from the search result list of the device discovery, the password determining unit 26 obtains the response packet that has been received from the chosen image forming apparatus 10, from the response packet storing unit 25. Then, the password determining unit 26 determines whether encrypted data by the specific method is included in the specific area of the obtained response packet.

If the password determining unit 26 determines that the encrypted data by the specific method is included in the response packet, the password converting unit 27 decrypts the encrypted data and restores the encrypted data to the original data. Here, the password converting unit 27 decrypts the data using the same method as the specific method used to encrypt the connection password in the image forming apparatus 10. Then, the password converting unit 27 generates a packet including the decrypted data.

More specifically, the password converting unit 27 decrypts the encrypted password included in the response packet using the same method as the specific method used to encrypt the connection password. By the decryption, the encrypted password is restored to the connection password before the encryption.

Then, the password converting unit 27 transmits the generated packet, and makes a request for establishing connection between the portable terminal 20 and the image forming apparatus 10, to the image forming apparatus 10 using the decrypted data as the password in the connection request, through the wireless communication unit 21.

Here, in the exemplary embodiment, the request packet generating unit 24 functions as one example of a searching unit. The wireless communication unit 21 functions as one example of a receiving unit. The password converting unit 27 functions as one example of a connection requesting unit, or one example of decrypting unit included in the terminal apparatus. The operation accepting unit 23 functions as one example of an accepting unit.

<Processing of Portable Terminal>

Figure 6:
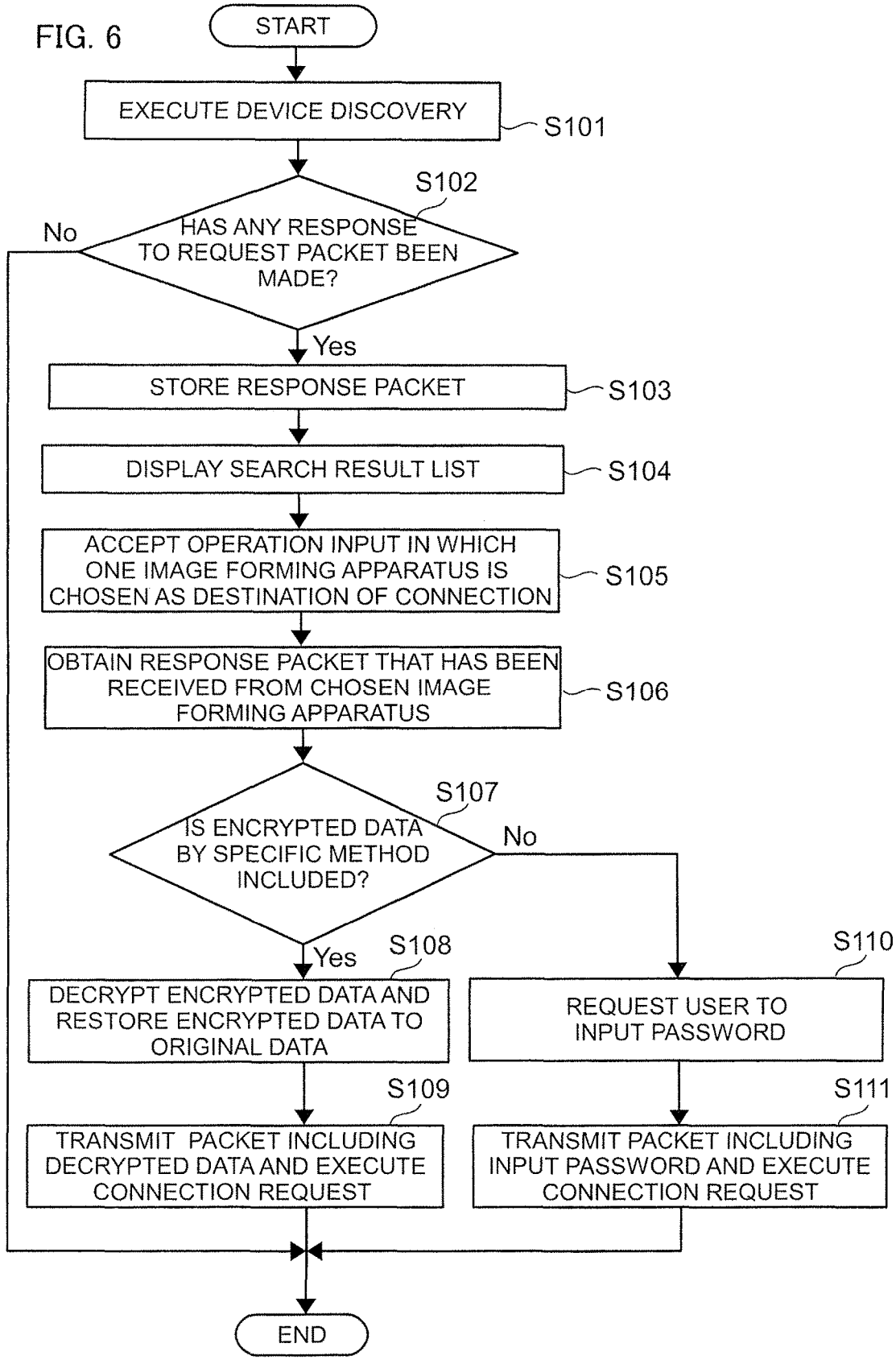
FIG. 6 is a flowchart showing one example of a processing procedure of the portable terminal in establishing the connection with the image forming apparatus in the exemplary embodiment 1.

Next, description will be given for the processing of the portable terminal 20 in establishing connection with the image forming apparatus 10. FIG. 6 is a flowchart showing one example of a processing procedure of the portable terminal 20 in establishing the connection with the image forming apparatus 10 in the exemplary embodiment 1.

First, a user chooses a button to execute device discovery, for example, and thereby the request packet generating unit 24 generates a request packet and executes device discovery (step 101). Next, the response packet storing unit 25 determines whether any response to the request packet has been made (step 102). In the case of determining any response has been made (Yes at step 102), the response packet storing unit 25 stores the response packet therein (step 103). On the other hand, in the case of determining no response has been made (No at step 102), there is no image forming apparatus 10 available for the portable terminal 20, and thus the processing flow ends.

After the step 103, the display 22 displays, on the screen, a list of the detected image forming apparatuses 10 as the search result list of the device discovery, that is, a list of the image forming apparatuses 10 having responded to the request packet (step 104). Here, the portable terminal 20 goes into a state of waiting for a user to choose a destination of connection from the list of the image forming apparatuses 10. Then, if the operation accepting unit 23 accepts operation input in which one image forming apparatus 10 is chosen as the destination of the connection (step 105), the password determining unit 26 obtains, from the response packet storing unit 25, the response packet that has been received from the chosen image forming apparatus 10 (step 106).

Next, the password determining unit 26 determines whether encrypted data by the specific method is included in the specific area of the obtained response packet (step 107). If the encrypted data by the specific method is determined to be included (Yes in step 107), the password converting unit 27 decrypts the encrypted data, and restores the encrypted data to the original data (step 108). Then, the password converting unit 27 generates a packet including the decrypted data, transmits the generated packet, and executes a connection request to the image forming apparatus 10, through the wireless communication unit 21 (step 109). Then, the processing flow ends.

On the other hand, if the encrypted data by the specific method is determined not to be included at step 107 (No at step 107), a user enters a password to establish the connection, since it is shifted to normal connection. That is, an apparatus other than the image forming apparatuses 10 according to the exemplary embodiment is considered to be chosen by a user. In this case, the display 22 displays a screen to request a user to input a password (step 110). Then, when the operation accepting unit 23 accepts the input of the password, the password converting unit 27 generates a packet including the input password, transmits the generated packet, and executes the connection request, through the wireless communication unit 21 (step 111). Then the processing flow ends.

<Processing of Image Forming Apparatus>

Figure 7:
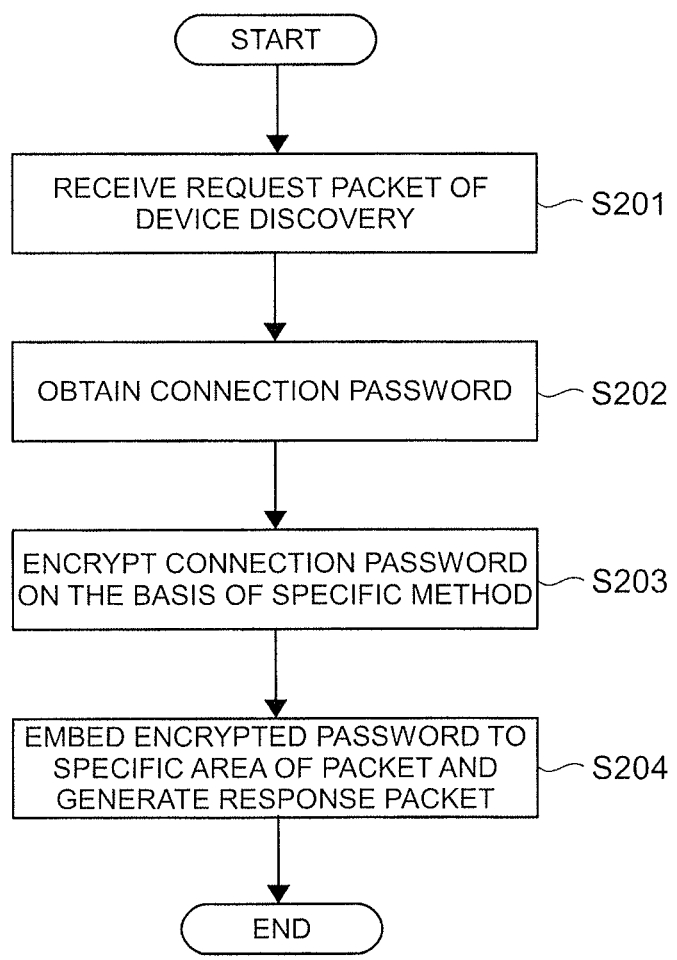
FIG. 7 is a flowchart showing one example of a processing procedure upon receiving a request packet of device discovery from the portable terminal in the exemplary embodiment 1.
Figure 8:
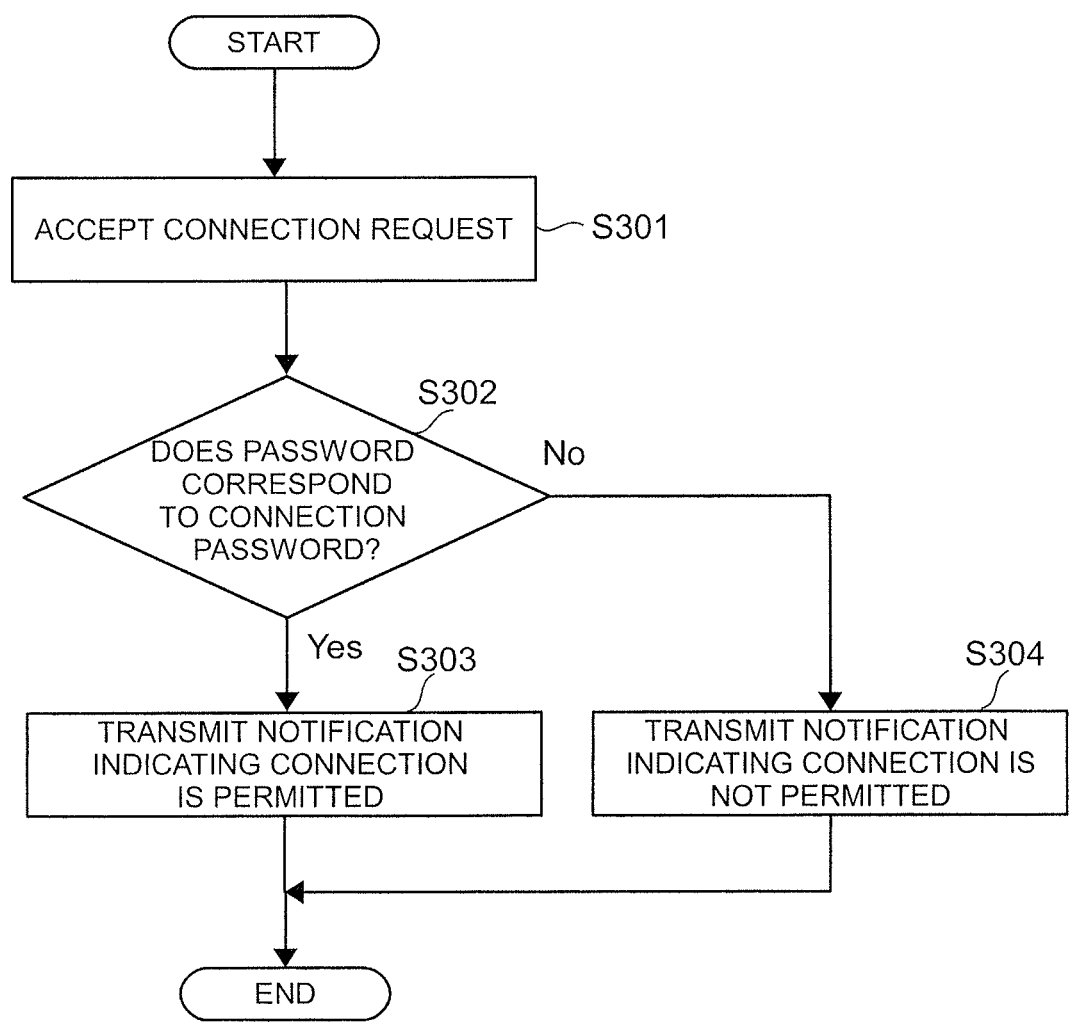
FIG. 8 is a flowchart showing one example of the processing procedure upon accepting a connection request from the portable terminal in the exemplary embodiment 1.

Next, description will be given for the processing of the image forming apparatus 10 in establishing connection with the portable terminal 20. FIG. 7 is a flowchart showing one example of a processing procedure upon receiving a request packet of device discovery from the portable terminal 20 in the exemplary embodiment 1. FIG. 8 is a flowchart showing one example of the processing procedure upon accepting a connection request from the portable terminal 20 in the exemplary embodiment 1.

First, description will be given for the flowchart shown in FIG. 7.

In response to execution of the device discovery in the portable terminal 20 at step 101 of FIG. 6, the wireless communication unit 11 firstly receives the request packet of the device discovery from the portable terminal 20 (step 201). Next, the password converting unit 13 obtains the connection password stored in the password memory 12 (step 202). Then, the password converting unit 13 encrypts the obtained connection password on the basis of the specific method (step 203).

Next, the information processing unit 14 embeds the encrypted password that has been subjected to the encryption by the password converting unit 13 to the specific area of the packet, and generates a response packet (step 204). Then, the information processing unit 14 transmits the generated response packet to the portable terminal 20 through the wireless communication unit 11. After that, the processing flow ends. In response to the transmission of the response packet after step 204, the portable terminal 20 receives the response packet, and stores the response packet at step 103 of FIG. 6.

Next, description will be given for the flowchart shown in FIG. 8.

In response to the connection request of the portable terminal 20 at step 109 in FIG. 6, the wireless communication unit 11 firstly accepts the connection request from the portable terminal 20 (step 301). Next, the information processing unit 14 determines whether the password included in the connection request corresponds to the connection password to be encrypted into the encrypted password embedded into the response packet at step 204 in FIG. 7 (step 302).

If the two passwords correspond to each other (Yes at step 302), the connection is permitted, and thus the information processing unit 14 transmits a notification indicating the connection is permitted, to the portable terminal 20 through the wireless communication unit 11 (step 303). Thereby, the connection is established between the image forming apparatus 10 and the portable terminal 20. After the connection is established, the image forming apparatus 10 accepts a print instruction from the portable terminal 20, and forms an image on a sheet of paper, and outputs the sheet of paper with the image. On the other hand, if the two passwords do not correspond to each other (No at step 302), the connection is not permitted, and thus the information processing unit 14 transmits a notification indicating the connection is not permitted, to the portable terminal 20 through the wireless communication unit 11 (step 304). Then, the processing flow ends.

As described above, in the exemplary embodiment 1, the image forming apparatus 10 encrypts the connection password used in establishing the connection, on the basis of the specific method, and embeds the encrypted password in the response packet to make a response, in response to the device discovery of the portable terminal 20, without user operation. Then, if the image forming apparatus 10 as the destination of the connection is chosen, the portable terminal 20 decrypts the encrypted password embedded into the response packet of the chosen image forming apparatus 10 to restore the encrypted password to the original password, and makes a connection request, without user input such as input of a password.

Further, in the exemplary embodiment, information on the connection password is not transmitted to the outside in unchanged form, but the encrypted form of the information is transmitted to the portable terminal 20. Then, the portable terminal 20 decrypts the encrypted password using the method same as the specific method used for the encryption in the image forming apparatus 10. Thus, for example, if the specific method used in the image forming apparatus 10 is employed in advance only in the portable terminals 20 which are permitted to be connected with the image forming apparatus 10 by an administrator or the like, establishment of connection between the image forming apparatus 10 and the portable terminals 20 not permitted to be connected may be avoided.

Exemplary Embodiment 2

Next, description will be given for the exemplary embodiment 2. In the exemplary embodiment 1, the portable terminal 20 decrypts the encrypted password, and makes a connection request using the decrypted password. On the other hand, in the exemplary embodiment 2, the portable terminal 20 further encrypts the encrypted password, and makes a connection request using the encrypted data (hereinafter, referred to as re-encrypted data). Note that, the hardware configurations of the image forming apparatus 10 and the portable terminal 20 are the same as those in the exemplary embodiment 1. Further, in the exemplary embodiment, the same units as those in the exemplary embodiment 1 are denoted by the same reference numerals, and the detailed description thereof is omitted.

In the exemplary embodiment, the portable terminal 20 has respective functional units shown in FIG. 5 similarly to the exemplary embodiment 1. However, the function of the password converting unit 27 is different from that in the exemplary embodiment 1.

If the password determining unit 26 determines that the encrypted data by the specific method is included in the specific area of the response packet, the password converting unit 27 further encrypts the encrypted data. Here, the password converting unit 27 performs the encryption using a method different from the specific method used in the image forming apparatus 10. Then, the password converting unit 27 generates a packet including the re-encrypted data. Further, the password converting unit 27 transmits the generated packet, and makes a connection request to the image forming apparatus 10 with the re-converted data as the password of the connection request, through the wireless communication unit 21. In the exemplary embodiment, the password converting unit 27 functions as one example of an encrypting unit included in the terminal apparatus.

Further, in the exemplary embodiment, the image forming apparatus 10 has respective functional units shown in FIG. 4 similarly to the exemplary embodiment 1. However, the function of the password converting unit 13 and the function of the information processing unit 14 are different from those in the exemplary embodiment 1.

If the connection request is accepted from the portable terminal 20 through the wireless communication unit 11, the password converting unit 13 decrypts the re-encrypted data included in the connection request, to restore the re-encrypted data to the former data.

The information processing unit 14 determines whether the password obtained by decrypting the re-encrypted data corresponds to the encrypted password embedded into the response packet. If these two passwords correspond to each other, the connection is permitted, and thus the information processing unit 14 transmits a notification indicating the connection is permitted, to the portable terminal 20 through the wireless communication unit 11.

Figure 9:
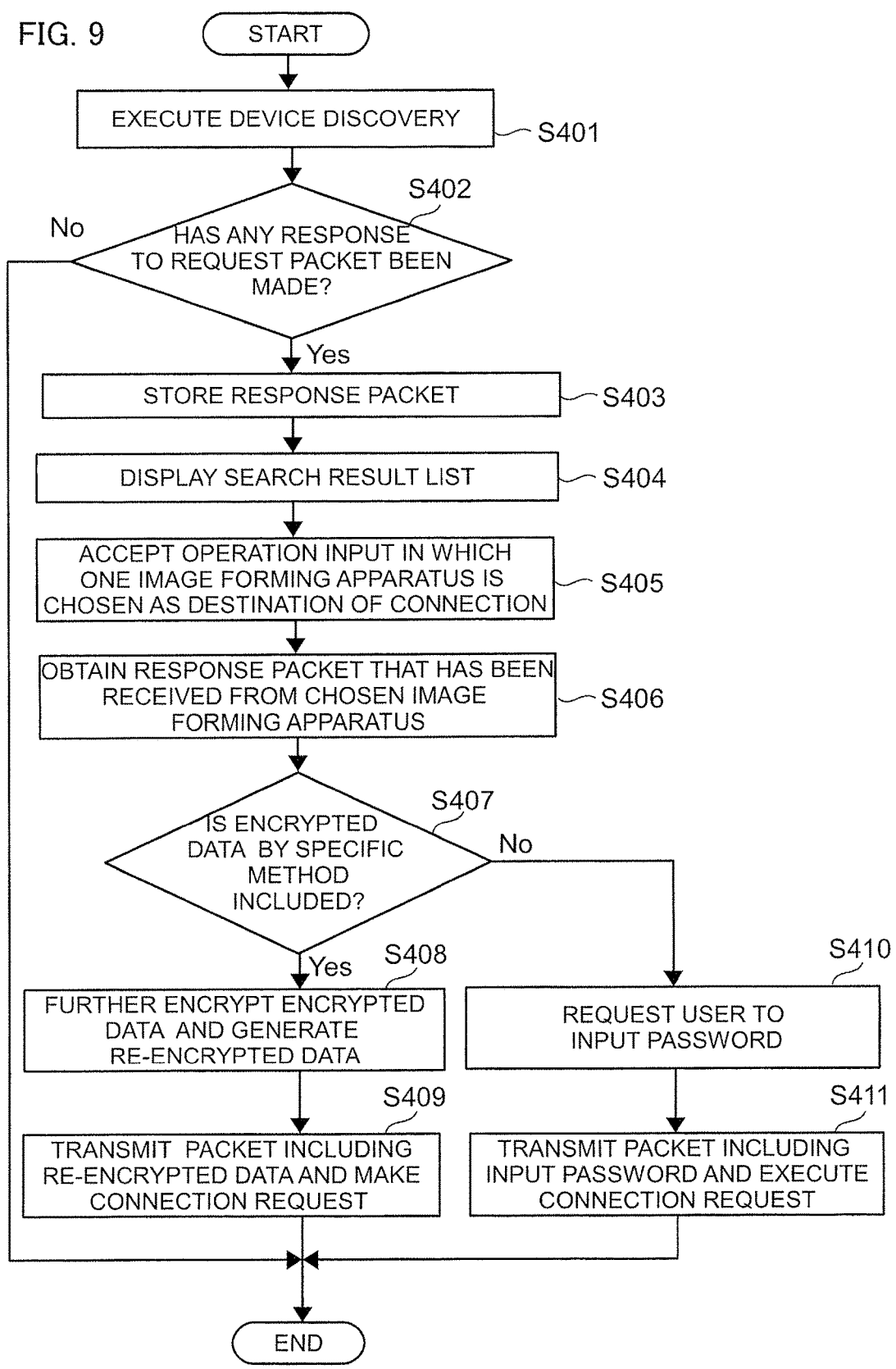
FIG. 9 is a flowchart showing one example of a processing procedure of the portable terminal in establishing the connection with the image forming apparatus in the exemplary embodiment 2.

Next, description will be given for the processing of the portable terminal 20 in establishing the connection with the image forming apparatus 10. FIG. 9 is a flowchart showing one example of a processing procedure of the portable terminal 20 in establishing the connection with the image forming apparatus 10 in the exemplary embodiment 2. Since the processing at steps 401 to 407, step 410, and step 411 is the same as the processing at steps 101 to 107, step 110, and step 111 in FIG. 6, the description thereof is omitted here.

If the encrypted data by the specific method is determined to be included at step 407 (Yes at step 407), the password converting unit 27 further encrypts the encrypted data using the method different from the specific method used in the image forming apparatus 10, and generates re-encrypted data (step 408). Further, the password converting unit 27 generates a packet including the re-encrypted data, and then transmits the generated packet, and makes a connection request to the image forming apparatus 10, through the wireless communication unit 21 (step 409). After that, the processing flow ends.

Figure 10:
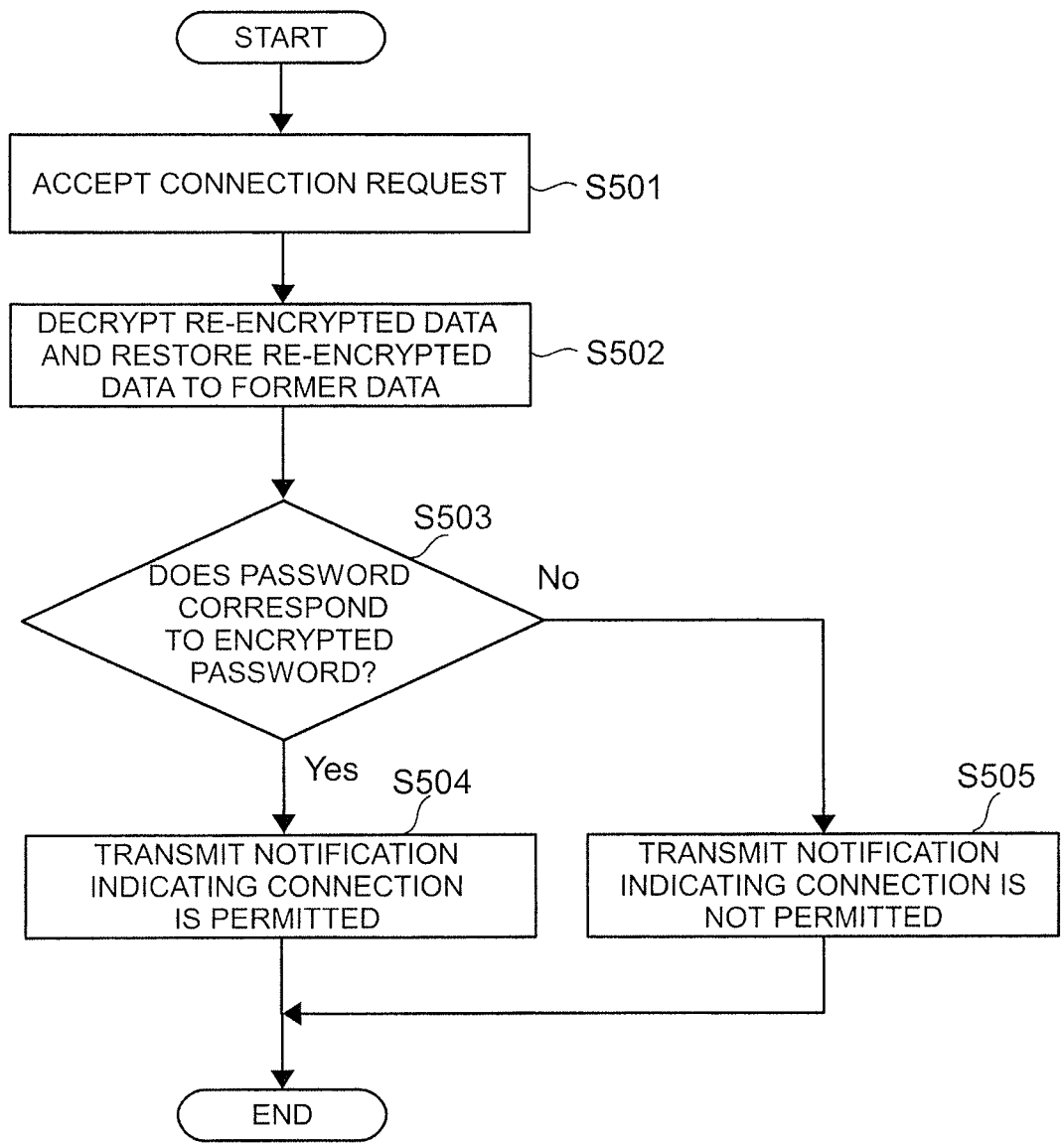
FIG. 10 is a flowchart showing one example of a processing procedure upon accepting a connection request from the portable terminal in the exemplary embodiment 2.

Next, description will be given for the processing of the image forming apparatus 10. FIG. 10 is a flowchart showing one example of a processing procedure upon accepting a connection request from the portable terminal 20 in the exemplary embodiment 2. Note that, in the exemplary embodiment, the processing upon receiving the request packet of the device discovery from the portable terminal 20 is the same as the processing shown in FIG. 7.

In response to the connection request of the portable terminal 20 at step 409 in FIG. 9, the wireless communication unit 11 accepts the connection request from the portable terminal 20 (step 501). Next, the information processing unit 14 decrypts the re-encrypted data included in the connection request, and restores the re-encrypted data to the former data (step 502). Here, the information processing unit 14 decrypts the re-encrypted data using the same method as the method used in the portable terminal 20 at step 408 in FIG. 9.

Next, the information processing unit 14 determines whether the password obtained by the decryption corresponds to the encrypted password embedded in the response packet (step 503). If the two passwords correspond to each other (Yes at step 503), the connection is permitted, and thus the information processing unit 14 transmits a notification indicating the connection is permitted, to the portable terminal 20 through the wireless communication unit 11 (step 504). Consequently, the connection is established between the image forming apparatus 10 and the portable terminal 20. On the other hand, if the two passwords do not correspond to each other (No at step 503), the connection is not permitted, and thus the information processing unit 14 transmits a notification indicating the connection is not permitted, to the portable terminal 20 through the wireless communication unit 11 (step 505). Then, the processing flow ends.

In the exemplary embodiment, the information processing unit 14 is configured to determine whether the password obtained by the decryption corresponds to the encrypted password. However, the determination is not limited to the above. Since the re-encrypted data has been encrypted twice, the connection password is obtained by decrypting the re-encrypted data twice. Thus, the information processing unit 14 may decrypts the re-encrypted data twice, and may determine whether the obtained password corresponds to the connection password to be encrypted into the encrypted password embedded into the response packet.

As described above, in the exemplary embodiment 2, the image forming apparatus 10 encrypts the connection password on the basis of the specific method, embeds the encrypted password into the response packet, and makes a response, without user operation. Then, if the image forming apparatus 10 as the destination of the connection is chosen, the portable terminal 20 further encrypts the encrypted password embedded into the response packet of the chosen image forming apparatus 10, and makes a connection request, without user input such as input of a password.

Further, in the exemplary embodiment, the portable terminal 20 further encrypts the encrypted password using the same method as the method employed in the image forming apparatus 10. Thus, for example, if the method used in the image forming apparatus 10 is employed in advance only in the portable terminals 20 which are permitted to be connected with the image forming apparatus 10 by an administrator or the like, establishment of connection between the image forming apparatus 10 and the portable terminals 20 not permitted to be connected may be avoided.

Exemplary Embodiment 3

Next, description will be given for the exemplary embodiment 3. In the exemplary embodiment 1, the portable terminal 20 decrypts the encrypted password, and makes the connection request using the decrypted password. On the other hand, in the exemplary embodiment 3, the portable terminal 20 makes the connection request using the encrypted password without decryption. Note that the hardware configurations of the image forming apparatus 10 and the portable terminal 20 are the same as those in the exemplary embodiment 1. Further, in the exemplary embodiment, the same units as those in the exemplary embodiment 1 are denoted by the same reference numerals, and the detailed description thereof is omitted.

Figure 11:
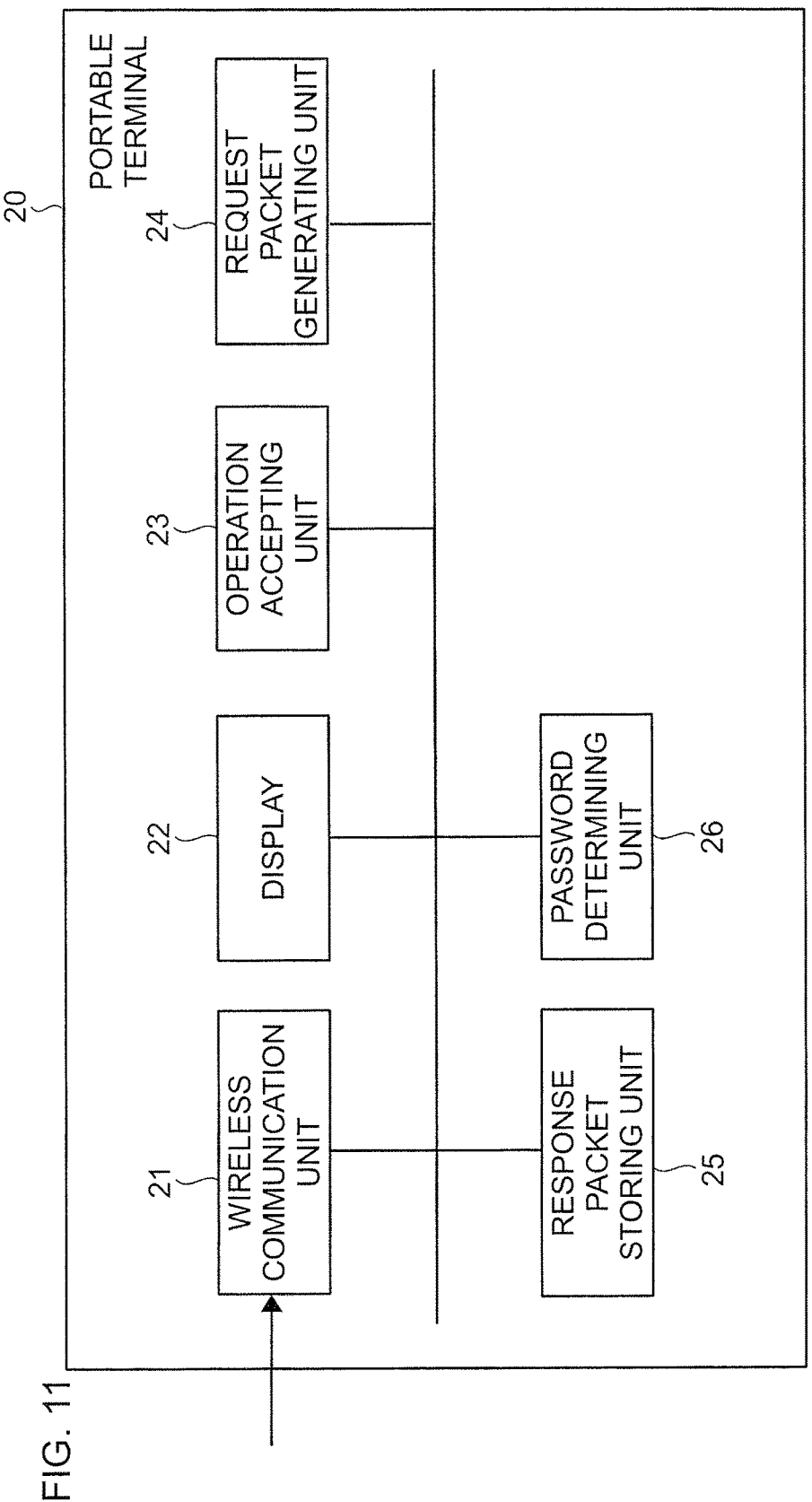
FIG. 11 is a block diagram illustrating one example of a functional configuration of the portable terminal according to the exemplary embodiment 3.

FIG. 11 is a block diagram illustrating one example of a functional configuration of the portable terminal 20 according to the exemplary embodiment 3. The password converting unit 27 is not included in the exemplary embodiment, differently from the exemplary embodiment 1. Further, the function of the password determining unit 26 is different from that in the exemplary embodiment 1.

If the password determining unit 26 determines that the encrypted data by the specific method is included in the specific area of the response packet, the password determining unit 26 generates the packet using the encrypted data as it is. Then, the password determining unit 26 transmits the generated packet, and makes a connection request to the image forming apparatus 10, through the wireless communication unit 21.

Further, in the exemplary embodiment, the image forming apparatus 10 includes the respective functional units shown in FIG. 4 similarly to the exemplary embodiment 1. However, the function of the information processing unit 14 is different from that in the exemplary embodiment 1.

Upon accepting the connection request from the portable terminal 20 through the wireless communication unit 11, the information processing unit 14 determines whether the password included in the connection request corresponds to the encrypted password embedded in the response packet. If the two passwords correspond to each other, the connection is permitted, and thus the information processing unit 14 transmits a notification indicating the connection is permitted, to the portable terminal 20 through the wireless communication unit 11.

Figure 12:
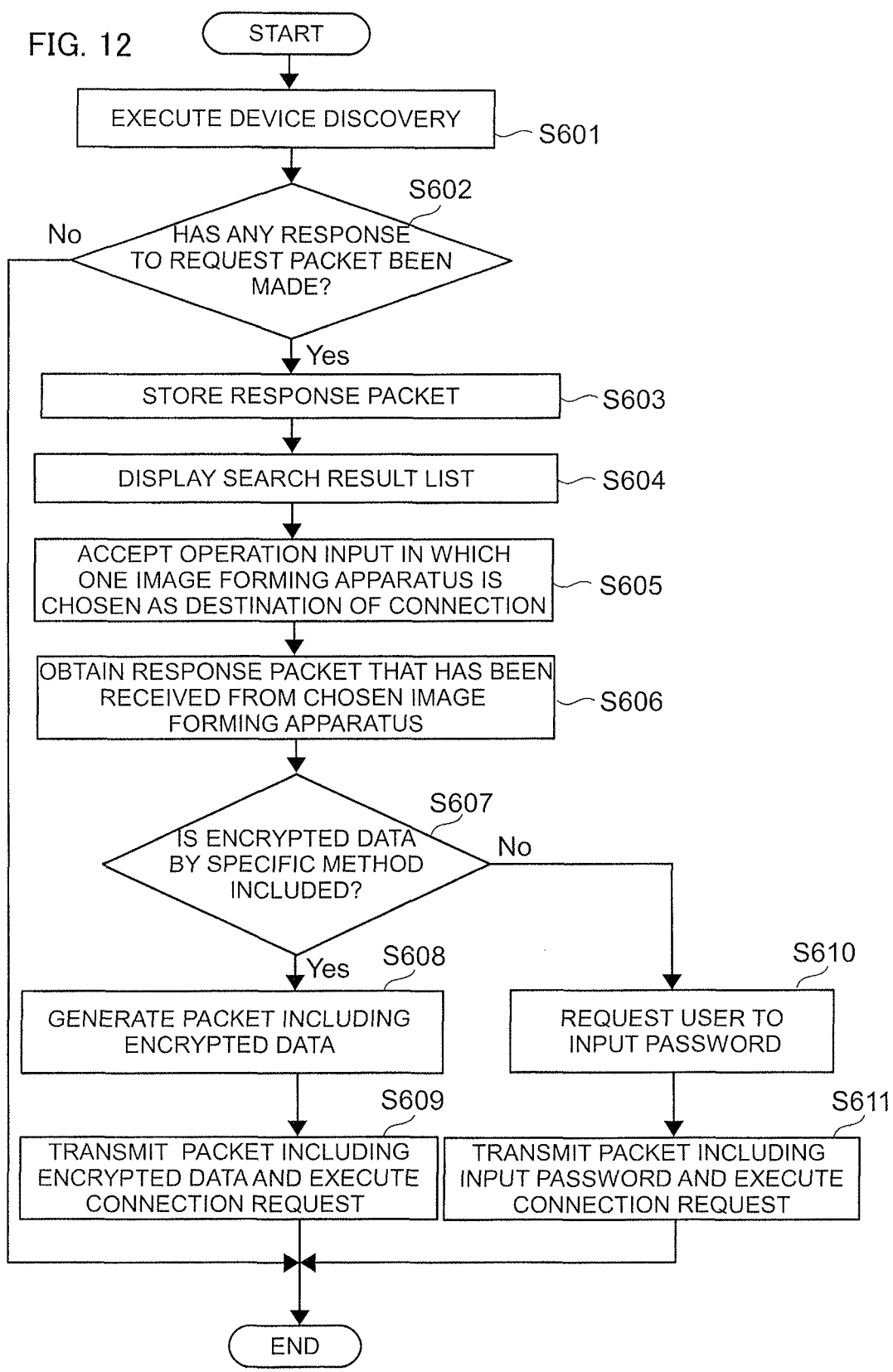
FIG. 12 is a flowchart showing one example of a processing procedure of the portable terminal in establishing the connection with the image forming apparatus in the exemplary embodiment 3.

Next, description will be given for the processing of the portable terminal 20 in establishing the connection with the image forming apparatus 10. FIG. 12 is a flowchart showing one example of a processing procedure of the portable terminal 20 in establishing the connection with the image forming apparatus 10 in the exemplary embodiment 3. Since the processing at steps 601 to 607, step 610, and step 611 is the same as the processing at steps 101 to 107, step 110, and step 111 in FIG. 6, the description is omitted here.

If the encrypted data by the specific method is determined to be included at step 607 (Yes at step 607), the password determining unit 26 generates a packet including the encrypted data (step 608). Then, the password determining unit 26 transmits the generated packet, and makes a connection request to the image forming apparatus 10, through the wireless communication unit 21 (step 609). Then, the processing flow ends.

Figure 13:
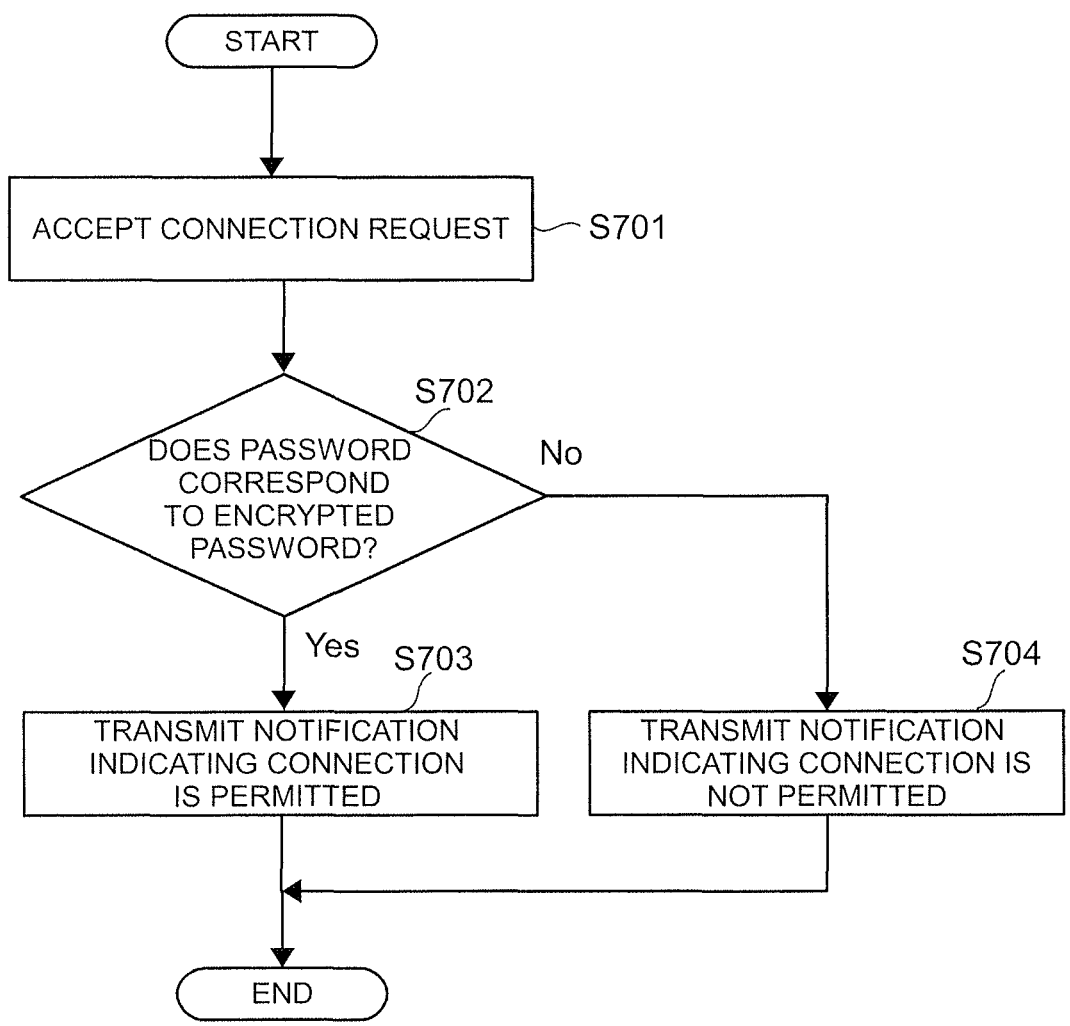
FIG. 13 is a flowchart showing one example of a processing procedure upon accepting a connection request from the portable terminal in the exemplary embodiment 3.

Next, description will be given for the processing of the image forming apparatus 10. FIG. 13 is a flowchart showing one example of a processing procedure upon accepting a connection request from the portable terminal 20 in the exemplary embodiment 3. Note that, in the exemplary embodiment, the processing upon receiving the request packet of the device discovery from the portable terminal 20 is the same as the processing shown in FIG. 7.

In response to the connection request of the portable terminal 20 at step 609 in FIG. 12, the wireless communication unit 11 accepts the connection request from the portable terminal 20 (step 701). Next, the information processing unit 14 determines whether the password included in the connection request corresponds to the encrypted password embedded into the response packet (step 702).

If the two passwords correspond to each other (Yes at step 702), the connection is permitted, and thus the information processing unit 14 transmits a notification indicating the connection is permitted to the portable terminal 20 through the wireless communication unit 11 (step 703). Consequently, the connection is established between the image forming apparatus 10 and the portable terminal 20. On the other hand, if the two passwords do not correspond to each other (No at step 702), the connection is not permitted, and thus the information processing unit 14 transmits a notification indicating the connection is not permitted to the portable terminal 20 through the wireless communication unit 11 (step 704). Then, the processing flow ends.

In the exemplary embodiment, the information processing unit 14 is configured to determine whether the password of the connection request corresponds to the encrypted password. However, the determination is not limited to the above. Since the password of the connection request is encrypted once, the information processing unit 14 may decrypt the password included in the connection request, and may determine whether the obtained password corresponds to the connection password to be encrypted into the encrypted password embedded into the response packet.

As described above, in the exemplary embodiment 3, the image forming apparatus 10 encrypts the connection password on the basis of the specific method, embeds the encrypted password into the response packet, and makes a response, without user operation. Then, if the image forming apparatus 10 as the destination of the connection is chosen, the portable terminal 20 transmits the encrypted password embedded in the response packet of the chosen image forming apparatus 10, and makes a connection request, without user input such as input of a password.

Exemplary Embodiment 4

Next, description will be given for the exemplary embodiment 4. In the exemplary embodiment 1, the image forming apparatus 10 encrypts the connection password, embeds the encrypted password into the response packet, and transmits the response packet to the portable terminal 20. On the other hand, in the exemplary embodiment 4, the image forming apparatus 10 embeds, in the response packet, the connection password without encryption, and transmits the response packet to the portable terminal 20. Note that, the hardware configurations of the image forming apparatus 10 and the portable terminal 20 are the same as those in the exemplary embodiment 1. Further, in the exemplary embodiment, the same units as those in the exemplary embodiment 1 are denoted by the same reference numerals, and the detailed description thereof is omitted.

In the exemplary embodiment, the portable terminal 20 has the configuration shown in FIG. 11 similarly to the exemplary embodiment 3, but the password converting unit 27 is not included differently from the exemplary embodiment 1. Further, the function of the password determining unit 26 is different from that in the exemplary embodiment 1.

If the operation accepting unit 23 accepts the operation input in which one image forming apparatus 10 is chosen from the search result list of the device discovery, the password determining unit 26 obtains the response packet that has been received from the chosen image forming apparatus 10, from the response packet storing unit 25. Then, the password determining unit 26 determines whether password-style data is included in the specific area of the obtained response packet by a predetermined rule. If the password determining unit 26 determines that the password-style data is included in the response packet, the password determining unit 26 generates a packet using the password-style data as it is. Then, the password determining unit 26 transmits the generated packet, and makes a connection request to the image forming apparatus 10, through the wireless communication unit 21.

Figure 14:
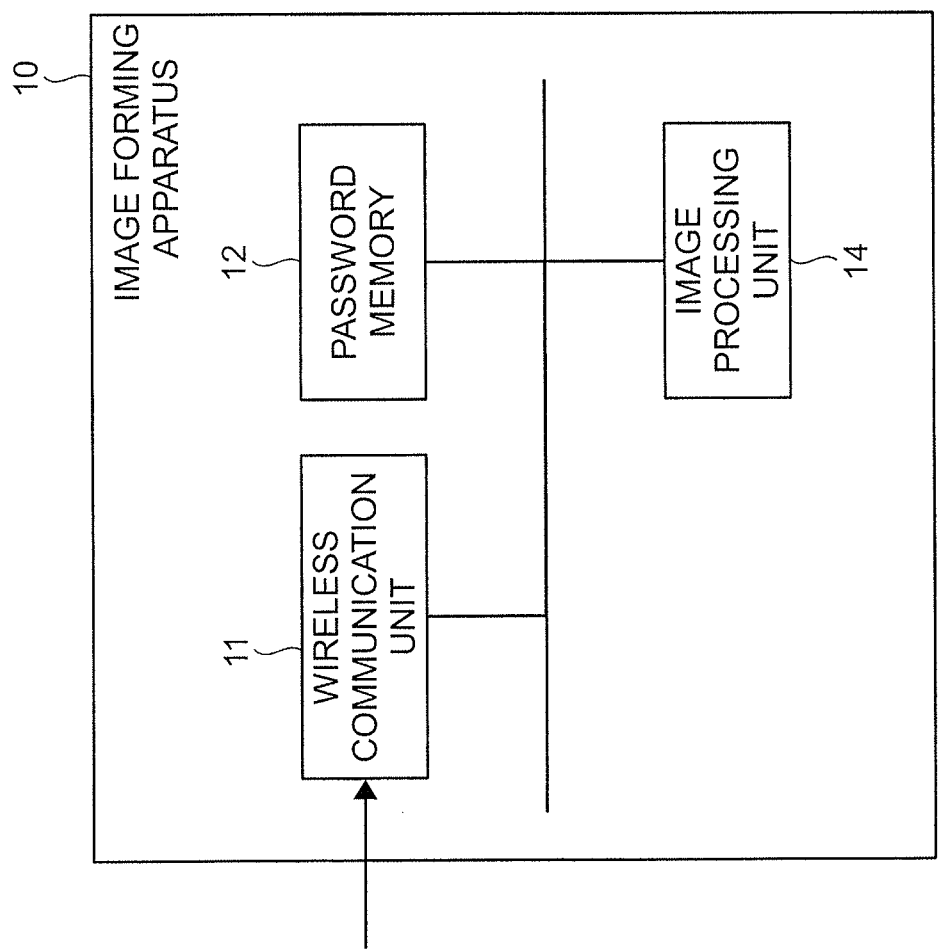
FIG. 14 is a block diagram illustrating one example of a functional configuration of the image forming apparatus according to the exemplary embodiment 4.

FIG. 14 is a block diagram illustrating one example of a functional configuration of the image forming apparatus 10 according to the exemplary embodiment 4. In the exemplary embodiment, the password converting unit 13 is not included differently from the exemplary embodiment 1. Further, the function of the information processing unit 14 is different from that in the exemplary embodiment 1.

If the wireless communication unit 11 receives the request packet of the device discovery from the portable terminal 20, the information processing unit 14 generates a response packet responding to the request packet. Here, the information processing unit 14 obtains the connection password stored in the password memory 12, embeds, in the specific area of the packet, the obtained connection password without encryption, and generates the response packet. Then, the information processing unit 14 transmits the generated response packet to the portable terminal 20 through the wireless communication unit 11.

Further, upon accepting the connection request from the portable terminal 20 through the wireless communication unit 11, the information processing unit 14 determines whether the password included in the connection request corresponds to the connection password embedded into the response packet. If the two passwords correspond to each other, the connection is permitted, and thus the information processing unit 14 transmits a notification indicating the connection is permitted, to the portable terminal 20 through the wireless communication unit 11.

Figure 15:
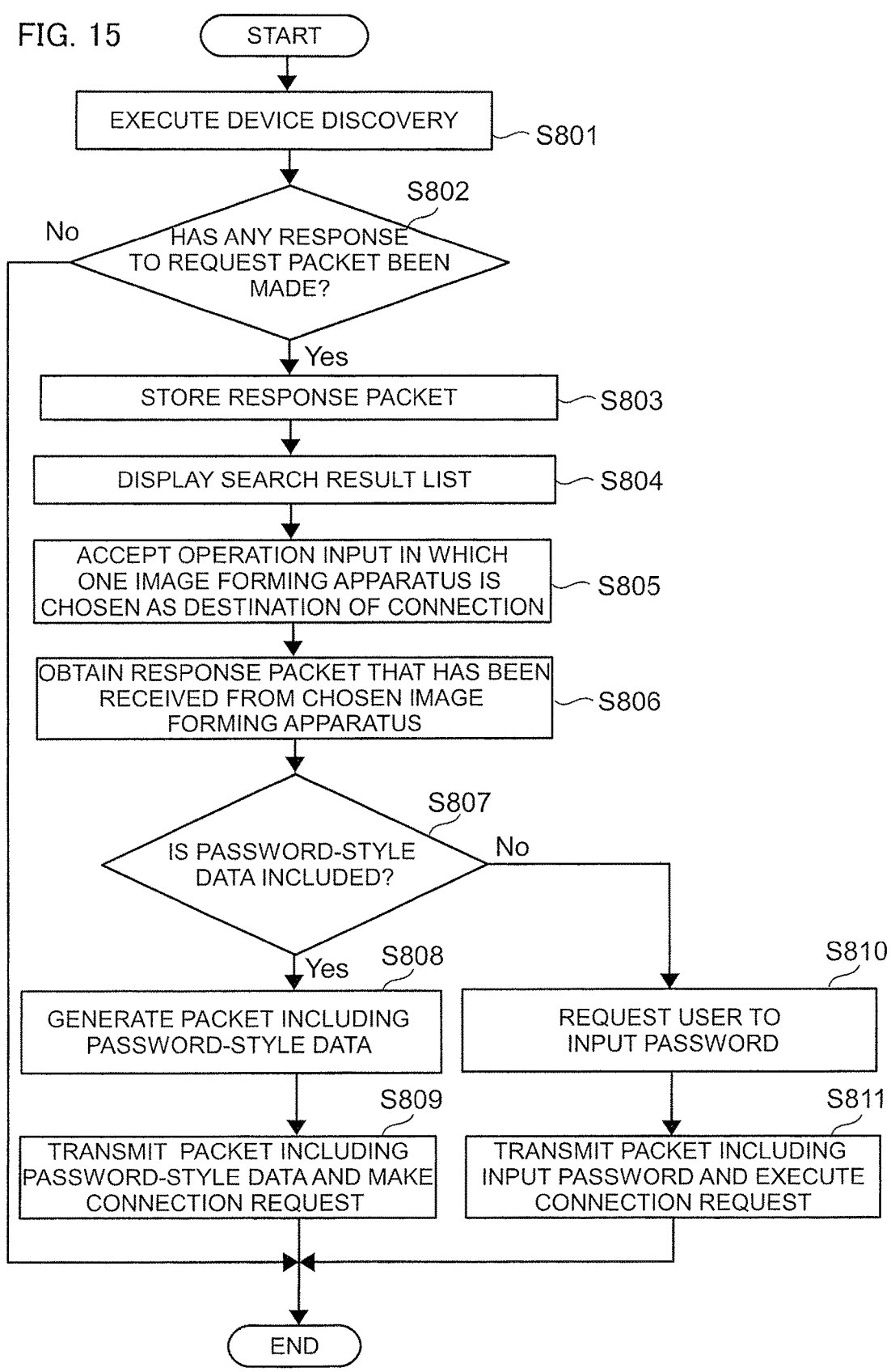
FIG. 15 is a flowchart showing one example of a processing procedure of the portable terminal in establishing the connection with the image forming apparatus in the exemplary embodiment 4.

Next, description will be given for the processing of the portable terminal 20 in establishing the connection with the image forming apparatus 10. FIG. 15 is a flowchart showing one example of a processing procedure of the portable terminal 20 in establishing the connection with the image forming apparatus 10 in the exemplary embodiment 4. Since the processing at steps 801 to 806, step 810, and step 811 is the same as the processing at steps 101 to 106, step 110, and step 111 in FIG. 6, the description is omitted here.

The password determining unit 26 obtains, from the response packet storing unit 25, the response packet that has been received from the chosen image forming apparatus 10 at step 806, and then determines whether password-style data is included in the specific area of the obtained response packet (step 807). If the password-style data is determined to be included (Yes at step 807), the password determining unit 26 generates a packet including the password-style data (step 808). Then, the password determining unit 26 transmits the generated packet, and makes a connection request to the image forming apparatus 10, through the wireless communication unit 21 (step 809). Then, the processing flow ends.

Figure 16:
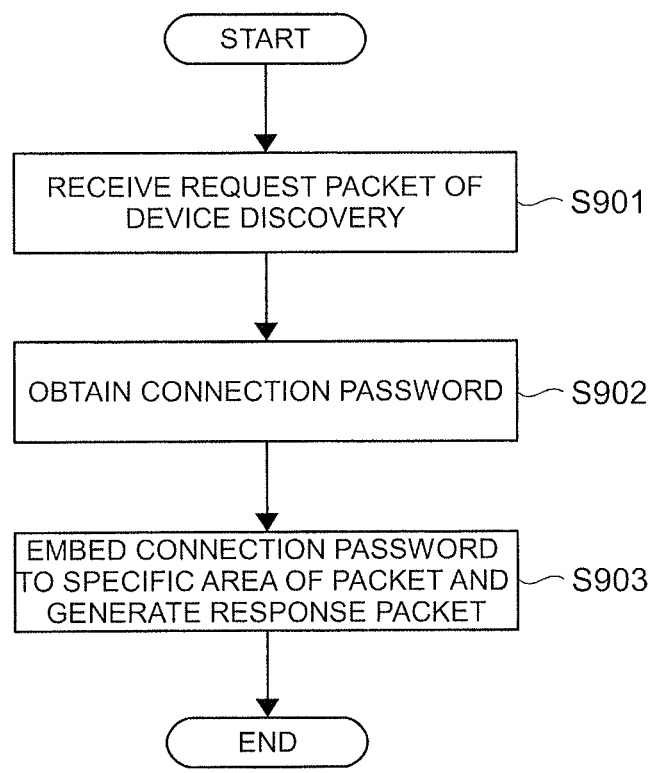
FIG. 16 is a flowchart showing one example of a processing procedure upon receiving a request packet of device discovery from the portable terminal in the exemplary embodiment 4.

Next, description will be given for the processing of the image forming apparatus 10. FIG. 16 is a flowchart showing one example of a processing procedure upon receiving a request packet of device discovery from the portable terminal 20 in the exemplary embodiment 4. Note that, in the exemplary embodiment, the processing upon accepting the connection request from the portable terminal 20 is the same as the processing shown in FIG. 8.

Since the processing at step 901 and step 902 shown in FIG. 16 is the same as the processing at step 201 and step 202 in FIG. 7, the description is omitted here.

After obtaining the connection password at step 902, the information processing unit 14 embeds, to the specific area of the packet, the obtained connection password without encryption, and generates a response packet (step 903). The generated response packet is transmitted to the portable terminal 20 through the wireless communication unit 11. Then, the processing flow ends.

As described above, in the exemplary embodiment 4, the image forming apparatus 10 embeds the connection password into the response packet and makes a response without user operation. Then, if the image forming apparatus 10 as the destination of the connection is chosen, the portable terminal 20 transmits the connection password embedded in the response packet of the chosen image forming apparatus 10 and makes a connection request, without user input such as input of a password.

Further, in the exemplary embodiment 4, the portable terminal 20 makes the connection request using the connection password included in the response packet without encryption, as an original form. However, the portable terminal 20 may encrypts the connection password and may make a connection request using the encrypted password. In this case, the portable terminal 20 encrypts the connection password included in the response packet that has been received from the image forming apparatus 10, transmits the packet including the encrypted password to the image forming apparatus 10, and makes a connection request. Further, upon accepting the connection request, the image forming apparatus 10 decrypts the data included in the connection request, and permits the connection if the password obtained by the decryption corresponds to the connection password. In this case, the portable terminal 20 and the image forming apparatus 10 have the same method, which is used to convert the password.

Further, in the exemplary embodiments 1 to 3, the image forming apparatus 10 is configured to encrypt the connection password upon receiving the request packet from the portable terminal 20. However, the connection password may be encrypted before the request packet is received. In this case, the password converting unit 13 obtains the connection password in advance from the password memory 12, and encrypts the connection password, before the request packet is received from the portable terminal 20. Then, in response to receiving the request packet from the portable terminal 20, the information processing unit 14 embeds the encrypted password to the specific area of the packet, and generates a response packet.

Further, in the exemplary embodiments 1 to 4, the image forming apparatus 10 may generate a response packet before receiving a request packet from the portable terminal 20. In this case, in the exemplary embodiments 1 to 3, the connection password is encrypted by the password converting unit 13 to produce the response packet. Then, in response to receiving the request packet from the portable terminal 20, the information processing unit 14 transmits the response packet that has been generated, to the portable terminal 20 through the wireless communication unit 11.

Furthermore, in the exemplary embodiments 1 to 4, a user chooses one image forming apparatus 10 as the destination of the connection from the search result list of the device discovery. However, the portable terminal 20 may choose one image forming apparatus 10 as the destination of the connection without user operation. In this case, the portable terminal 20 detects the image forming apparatuses 10 with the response packets, and then chooses one image forming apparatus 10 as the destination of the connection from among the detected image forming apparatuses 10 according to the predetermined rule without waiting user operation. Then, the portable terminal 20 makes a connection request to the chosen image forming apparatus 10 by the aforementioned procedure in each of the exemplary embodiments 1 to 4.

Here, examples of the predetermined rule include a rule in which the image forming apparatus 10 having the strongest intensity of radio wave is chosen, and a rule in which the image forming apparatus 10 most frequently connected with the portable terminal 20 until now is chosen. Alternatively, as the predetermined rule, there may be adopted a rule in which the image forming apparatus 10 estimated to be located on the nearest position from the portable terminal 20 on the basis of the response packet may be chosen.

In this case, the password determining unit 26 functions as one example of a choosing unit.

Still furthermore, in the exemplary embodiments 1 to 4, the description has been given for the configuration in which connection is established between the image forming apparatus 10 performing processing of image formation and the portable terminal 20. However, the image forming apparatus 10 may be switched to another apparatus such as a PC, a portable information terminal (a so-called smartphone, tablet terminal or the like). In this case, the computer used instead of the image forming apparatus 10 may be an apparatus having the hardware configuration shown in FIG. 3, for example.

Note that, although this invention has been described using the exemplary embodiments, the technical scope of this invention is not limited to the aforementioned exemplary embodiments. It is obvious for persons skilled in the art that various changes can be made and alternative embodiment can be adopted without deviation from the spirit and range of this invention.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processor comprising:
at least one hardware processor configured to implement:
    a responding unit configured to transmit data including a predetermined password to a terminal apparatus;
    a connection establishing unit configured to establish a connection in a case in which a connection request using the predetermined password transmitted by the responding unit is accepted from the terminal apparatus, the connection request comprising a request to establish the connection between the information processor and the terminal apparatus,
wherein the connection request is generated in response to a determination that the predetermined password is included in the data, the determination being performed after a user selection, at the terminal apparatus, of the information processor, and
wherein the user selection is performed after the responding unit transmits the data including the predetermined password to the terminal apparatus.

2. The information processor according to claim 1, wherein the at least one processor is further configured to implement:
    an encrypting unit configured to encrypt the predetermined password by using a same method employed in the terminal apparatus, wherein
the responding unit is further configured to transmit data including the encrypted predetermined password to the terminal apparatus.

3. The information processor according to claim 2, wherein
    the connection establishing unit is further configured to establish the connection between the information processor and the terminal apparatus in a case where the connection request including data corresponding to the predetermined password before encryption by the encrypting unit is accepted by the connection establishing unit.

4. An image forming apparatus comprising:
a hardware processor configured to implement:
    a responding unit configured to transmit data including a predetermined password to a terminal apparatus;
    a connection establishing unit configured to establish a connection in a case in which a connection request using the predetermined password transmitted by the responding unit is accepted from the terminal apparatus, the connection request comprising a request to establish the connection between the image forming apparatus and the terminal apparatus;
    an image forming unit configured to form an image on a recording medium in response to a print instruction accepted from the terminal apparatus after the connection establishing unit establishes the connection,
wherein the connection request is generated in response to a determination that the predetermined password is included in the data, the determination being performed after a user selection, at the terminal apparatus, of the image forming apparatus, and
wherein the user selection is performed after the responding unit transmits the data including the predetermined password to the terminal apparatus.

5. A terminal apparatus comprising:
a hardware processor configured to implement:

a searching unit configured to search for an information processor connectable with the terminal apparatus;

a receiving unit configured to receive data including a predetermined password, as a response to the search, from the information processor;

an accepting unit configured to receive a user selection of the information processor;

a determination unit configured to determine, after the user selection, whether the data includes the predetermined password; and a connection requesting unit configured to, in response to the determination, request the information processor to establish the connection between the terminal apparatus and the information processor by using the predetermined password, wherein the user selection is performed after the receiving unit receives the data including the predetermined password from the information processor.

6. The terminal apparatus according to claim 5, wherein the at least one hardware processor is further configured to implement:

a choosing unit configured to choose, in response to the user selection, the information processor as destination of the connection, according to a predetermined rule, wherein the connection requesting unit is further configured to request the chosen information processor to establish the connection between the terminal apparatus and the chosen information processor by using the predetermined password received from the chosen information processor.

7. The terminal apparatus according to claim 5, wherein the at least one hardware processor is further configured to implement:

a decrypting unit, in a case where the predetermined password is encrypted by the information processor, configured to decrypt the encrypted predetermined password by using a same method as used for encryption by the information processor, wherein the connection requesting unit is further configured to transmit the predetermined password, which the decrypting unit has decrypted, and to request the information processor to establish the connection with the terminal apparatus.

8. The terminal apparatus according to claim 6, wherein the at least one hardware processor is further configured to implement:

a decrypting unit, in a case where the predetermined password is encrypted by the information processor, configured to decrypt the encrypted predetermined password by using a same method as used for encryption by the information processor, wherein the connection requesting unit is further configured to transmit the predetermined password which the decrypting unit has decrypted, and to request the information processor to establish the connection with the terminal apparatus.

9. The terminal apparatus according to claim 5, wherein the at least one hardware processor is further configured to implement:

an encrypting unit, in a case where the predetermined password is encrypted by the information processor, configured to further encrypt the encrypted predetermined password by using a method different from a method used for encryption by the information processor, wherein the connection requesting unit is further configured to transmit the further encrypted predetermined password, and to request the information processor to establish the connection with the terminal apparatus.

10. The terminal apparatus according to claim 6, wherein the at least one hardware processor is further configured to implement:

an encrypting unit, in a case where the predetermined password is encrypted by the information processor, configured to further encrypt the encrypted predetermined password by using a method different from a method used for the encryption by the information processor, wherein the connection requesting unit is further configured to transmit the further encrypted predetermined password, and to request the information processor to establish the connection with the terminal apparatus.

11. An information processing system comprising:

a terminal apparatus comprising:

a first hardware processor configured to implement:

a searching unit configured to perform a search for an information processor connectable with the terminal apparatus;

a receiving unit configured to receive data including a predetermined password, as a response to the search;

an accepting unit configured to receive a user selection of the information processor;

a determination unit configured to determine, after the user selection, whether the data includes the predetermined password;

a connection requesting unit configured to, in response to the determination, request the information processor to establish a connection between the terminal apparatus and the information processor by using the predetermined password received by the receiving unit; and an information processor comprising:

a second hardware processor configured to implement:

a responding unit configured to transmit data including the predetermined password to the terminal apparatus; and a connection establishing unit configured to establish the connection in a case where a connection request by using the predetermined password transmitted by the responding unit is accepted from the terminal apparatus, the connection request comprising a request to establish the connection between the information processor and the terminal apparatus, wherein the user selection is performed after the responding unit transmits the data including the predetermined password to the terminal apparatus.

12. A non-transitory computer readable medium storing a program causing a computer to execute a process of establishing a connection, the process comprising:

transmitting data including a predetermined password to a terminal apparatus;

establishing the connection in a case where a connection request using the predetermined password, transmitted in a response, is accepted from the terminal apparatus, the connection request comprising request to establish the connection between the computer and the terminal apparatus, wherein the connection request is generated in response to a determination of the predetermined password being included in the data, and the determination being performed after a user selection of the image forming apparatus from the terminal apparatus, and wherein the user selection is performed after the data including the predetermined password is transmitted to the terminal apparatus.

13. A non-transitory computer readable medium storing a program causing a computer to execute a process of establishing a connection, the process comprising:

searching for an information processor connectable with the computer;

receiving data including a predetermined password, as a response to the search, from the information processor obtained by the search;

accepting a user selection of an information processor;

determining, after the user selection, whether the data includes the predetermined password; and requesting the information processor to establish the connection between the computer and the information processor by using the received predetermined password, wherein the user selection is performed after the data including the predetermined password is received from the information processor.

14. A terminal apparatus comprising:

at least one hardware processor configured to implement:

a searching unit configured to search for an information processor connectable with the terminal apparatus;

a receiving unit configured to receive data including a predetermined password, as a response to the search, from the information processor;

a connection requesting unit configured to request the information processor to establish the connection between the terminal apparatus and the information processor by using the predetermined password;

an encrypting unit, in a case where the predetermined password is encrypted by the information processor, configured to further encrypt the encrypted predetermined password by using a method different from a method used for encryption by the information processor, wherein the connection requesting unit is further configured to transmit the further encrypted predetermined password, and to request the information processor to establish the connection with the terminal apparatus.

15. The terminal apparatus according to claim 5, wherein the user selection is a selection of the information processor from a display of the terminal apparatus displaying a search result including an indication of the information processor.

16. The terminal apparatus according to claim 5, wherein the connection unit is configured to, in response to the determination unit determining that data transmitted from the information processor does not include the predetermined password, request a user to input a password and to request the connection using the password.

* * * * *